US008423661B2

(12) United States Patent
Arita et al.

(10) Patent No.: US 8,423,661 B2
(45) Date of Patent: *Apr. 16, 2013

(54) PACKET COMMUNICATION DEVICE, PACKET COMMUNICATION SYSTEM, PACKET COMMUNICATION MODULE, DATA PROCESSOR, AND DATA TRANSFER SYSTEM

(75) Inventors: Hiroshi Arita, Hitachi (JP); Yasuhiro Nakatsuka, Tokai-mura (JP); Yasuwo Watanabe, Hitachiohta (JP); Kei Ouchi, Naka-machi (JP); Yoshihiro Tanaka, Sagamihara (JP); Toshinobu Kanai, Kodaira (JP); Masanobu Tanaka, Hitachi (JP); Kenji Furuhashi, Hitachi (JP); Tomoaki Aoki, Omiya-machi (JP)

(73) Assignees: Renesas Electronics Corporation, Kanagawa (JP); Hitachi Information & Control Solutions, Ltd., Ibaraki (JP)

( * ) Notice: Subject to any disclaimer, the term of this patent is extended or adjusted under 35 U.S.C. 154(b) by 140 days.

This patent is subject to a terminal disclaimer.

(21) Appl. No.: 12/873,893

(22) Filed: Sep. 1, 2010

(65) Prior Publication Data

US 2011/0096667 A1 Apr. 28, 2011

Related U.S. Application Data

(63) Continuation of application No. 12/010,762, filed on Jan. 29, 2008, now Pat. No. 7,814,223, which is a continuation of application No. 10/298,520, filed on Nov. 19, 2002, now abandoned.

(30) Foreign Application Priority Data

Nov. 20, 2001 (JP) .................................. 2001-355198
Apr. 26, 2002 (JP) .................................. 2002-126276

(51) Int. Cl.
*G06F 13/00* (2006.01)

(52) U.S. Cl.
USPC ........... 709/235; 709/232; 709/234; 370/429; 370/428

(58) Field of Classification Search .................. 709/235, 709/232, 234; 370/429, 428
See application file for complete search history.

(56) References Cited

U.S. PATENT DOCUMENTS

| 5,434,848 | A | 7/1995 | Chimento et al. |
| 5,546,389 | A | 8/1996 | Wippenbeck et al. |
| 6,532,520 | B1 | 3/2003 | Dean et al. |
| 6,920,109 | B2 | 7/2005 | Yazaki et al. |
| 7,496,679 | B2 | 2/2009 | Arita et al. |
| 7,814,223 | B2 * | 10/2010 | Arita et al. ............ 709/235 |
| 2002/0093910 | A1 | 7/2002 | Yazaki et al. |

FOREIGN PATENT DOCUMENTS

WO　　WO 99/66676　　12/1999

OTHER PUBLICATIONS

"Priority-baed ATM Network Congestion Control", by Yang Hui, et al., Journal of Jinzhou Normal College (National Science Edition), Mar. 1999.
IEEE, 802.1Q-1998 IEEE Standards for Local and Metroplian Area Networks: Virtual Bridged Local Area Networks 1998, 8. Principles of Operatoin, pp. 23-40.

* cited by examiner

*Primary Examiner* — Kenneth R Coulter
(74) *Attorney, Agent, or Firm* — Dickstein Shapiro LLP

(57) ABSTRACT

A transmit packet generated by a CPU 1 is held in a buffer 100a (100b). From among packets received from Ethernet 820a (820b), a packet, a destination of which is a communication device 800, is held in the buffer 100a (100b). A packet which should be transmitted is transmitted from a transfer judging circuit 200 to Ethernet 820a or 820b through a MAC unit 300a or 300b. If a transfer judging circuit 200 judges a packet from the Ethernet 820a to be a packet, a destination of which is another communication device, with reference to a destination MAC address, this packet is transferred to the Ethernet 820b through MAC 300b. If a usage rate of a transferring FIFO buffer 130a (130b) exceeds a threshold value in the process of transmitting a packet held in a transmitting FIFO buffer 120a (130b) on a priority basis, the priority order of a transfer packet is made higher than that of a transmit packet so that the transfer packet is transferred to the Ethernet 820a or 820b in preference to the transmit packet. This prevents a transfer buffer means from overflowing.

7 Claims, 22 Drawing Sheets

| | USAGE RATE OF TRANSMITTING FIFO BUFFER 120 | |
|---|---|---|
| | REGISTER R2303 - SET VALUE OR LESS | REGISTER R2303 - MORE THAN SET VALUE |
| USAGE RATE OF TRANSFERRING FIFO BUFFER 130 — REGISTER R2304 - SET VALUE OR LESS | SETTING OF REGISTER R2301 | TRANSMITTING FIFO BUFFER 120 IS SELECTED ON A PRIORITY BASIS |
| USAGE RATE OF TRANSFERRING FIFO BUFFER 130 — REGISTER R2304 - MORE THAN SET VALUE | TRANSFERRING FIFO BUFFER 130 IS SELECTED ON A PRIORITY BASIS | TRANSFERRING FIFO BUFFER 130 IS SELECTED ON A PRIORITY BASIS |

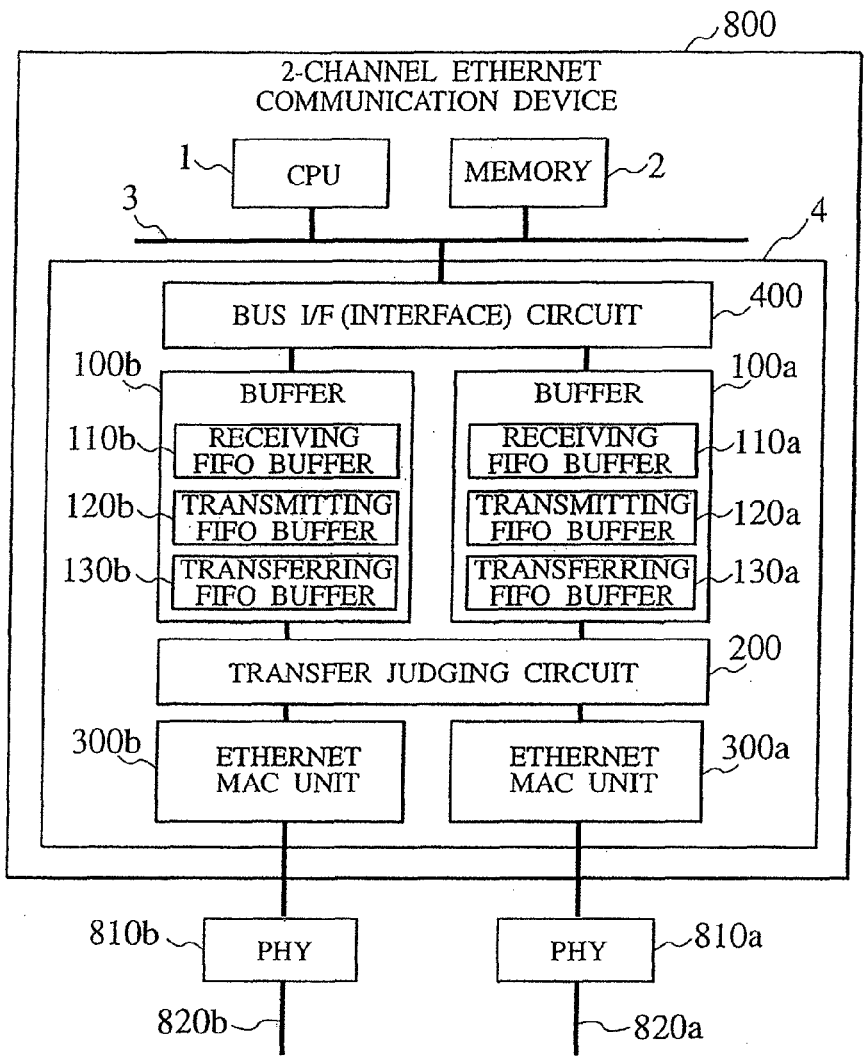
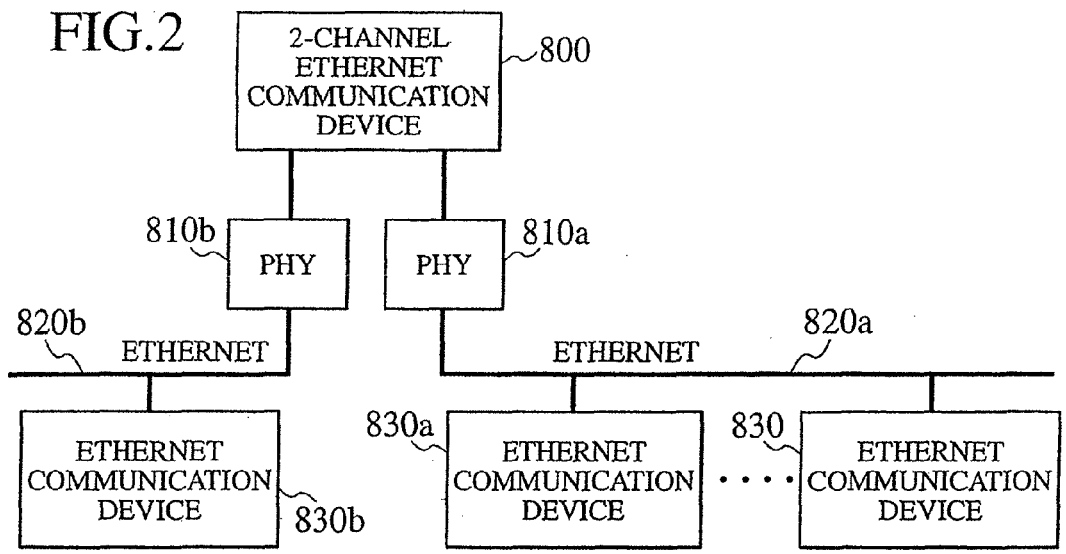

FIG.7

| INDEX | NAME | USE FOR REGISTERS | VALUE LOADED IN REGISTERS |
|---|---|---|---|
| 1 | R2301 | PROCESSING EXECUTED WHEN MAC ADDRESS IS NOT REGISTERED IN CAM | RECEIVE, TRANSFER, RECEIVE & TRANSFER |
| 2 | R2302 | FIFO SELECTION USUALLY PERFORMED ON A PRIORITY BASIS | TRANSMIT, TRANSFER |
| 3 | R2303 | THRESHOLD VALUE OF USAGE RATE OF TRANSMITTING FIFO BUFFER, WHICH IS USED FOR PRIORITY SWITCHING | 0 ~ 100 % |
| 4 | R2304 | THRESHOLD VALUE OF USAGE RATE OF TRANSFERRING FIFO BUFFER, WHICH IS USED FOR PRIORITY SWITCHING | 0 ~ 100 % |
| 5 | R2305 | THRESHOLD VALUE OF USAGE RATE OF RECEIVING FIFO BUFFER, WHICH IS USED TO INVOKE FLOW CONTROL | 0 ~ 100 % |
| 6 | R2306 | THRESHOLD VALUE OF USAGE RATE OF TRANSFERRING FIFO BUFFER, WHICH IS USED TO INVOKE FLOW CONTROL | 0 ~ 100 % |

FIG.8

| INDEX | MAC ADDRESS | TRANSFER/RECEIVE | WORK AREA |
|---|---|---|---|
| 1 | 00.01.02.03.04.05 | TRANSFER | |
| 2 | 01.02.03.04.05.06 | RECEIVE & TRANSFER | |
| ⋮ | ⋮ | ⋮ | ⋮ |
| N | 00.11.22.33.44.55 | RECEIVE | |

FIG.9

| | USAGE RATE OF TRANSMITTING FIFO BUFFER 120 | |
|---|---|---|
| | REGISTER R2303 - SET VALUE OR LESS | REGISTER R2303 - MORE THAN SET VALUE |
| USAGE RATE OF TRANSFERRING FIFO BUFFER 130 — REGISTER R2304 - SET VALUE OR LESS | SETTING OF REGISTER R2301 | TRANSMITTING FIFO BUFFER 120 IS SELECTED ON A PRIORITY BASIS |
| USAGE RATE OF TRANSFERRING FIFO BUFFER 130 — REGISTER R2304 - MORE THAN SET VALUE | TRANSFERRING FIFO BUFFER 130 IS SELECTED ON A PRIORITY BASIS | TRANSFERRING FIFO BUFFER 130 IS SELECTED ON A PRIORITY BASIS |

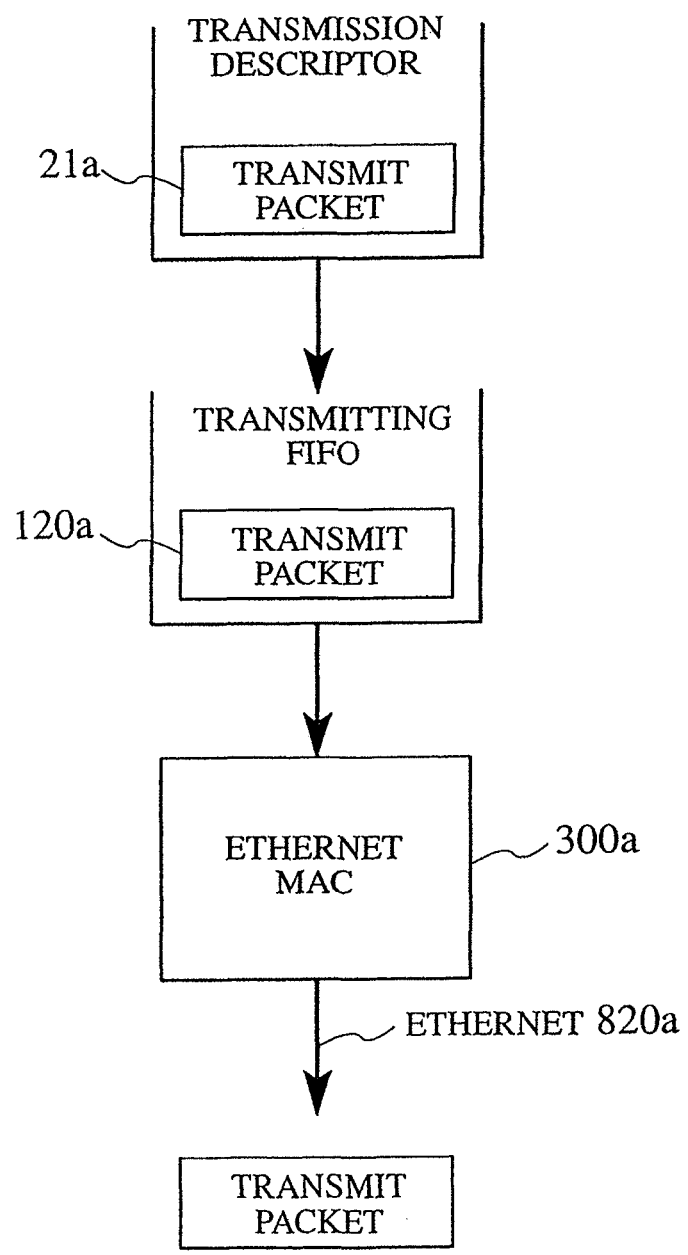

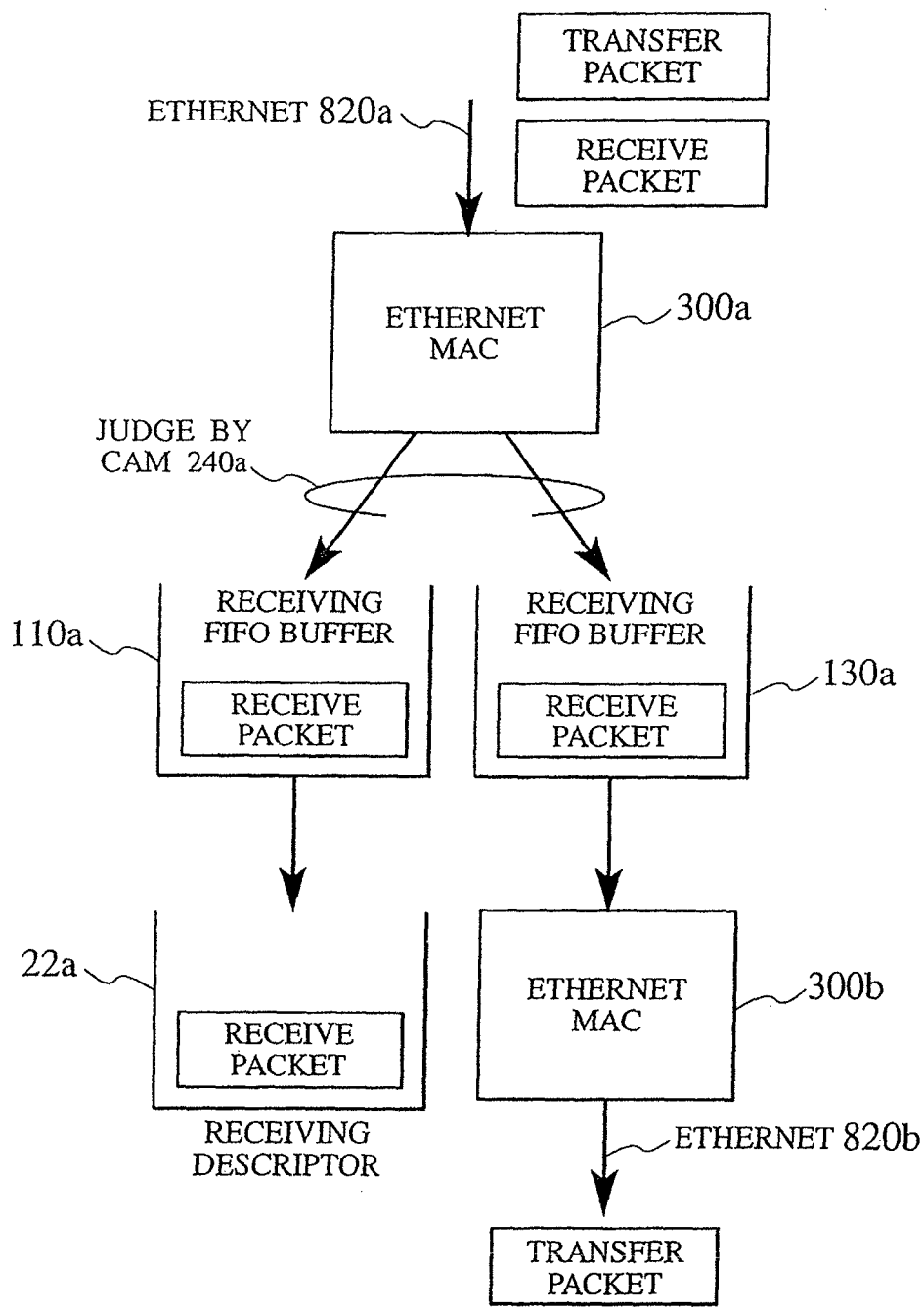

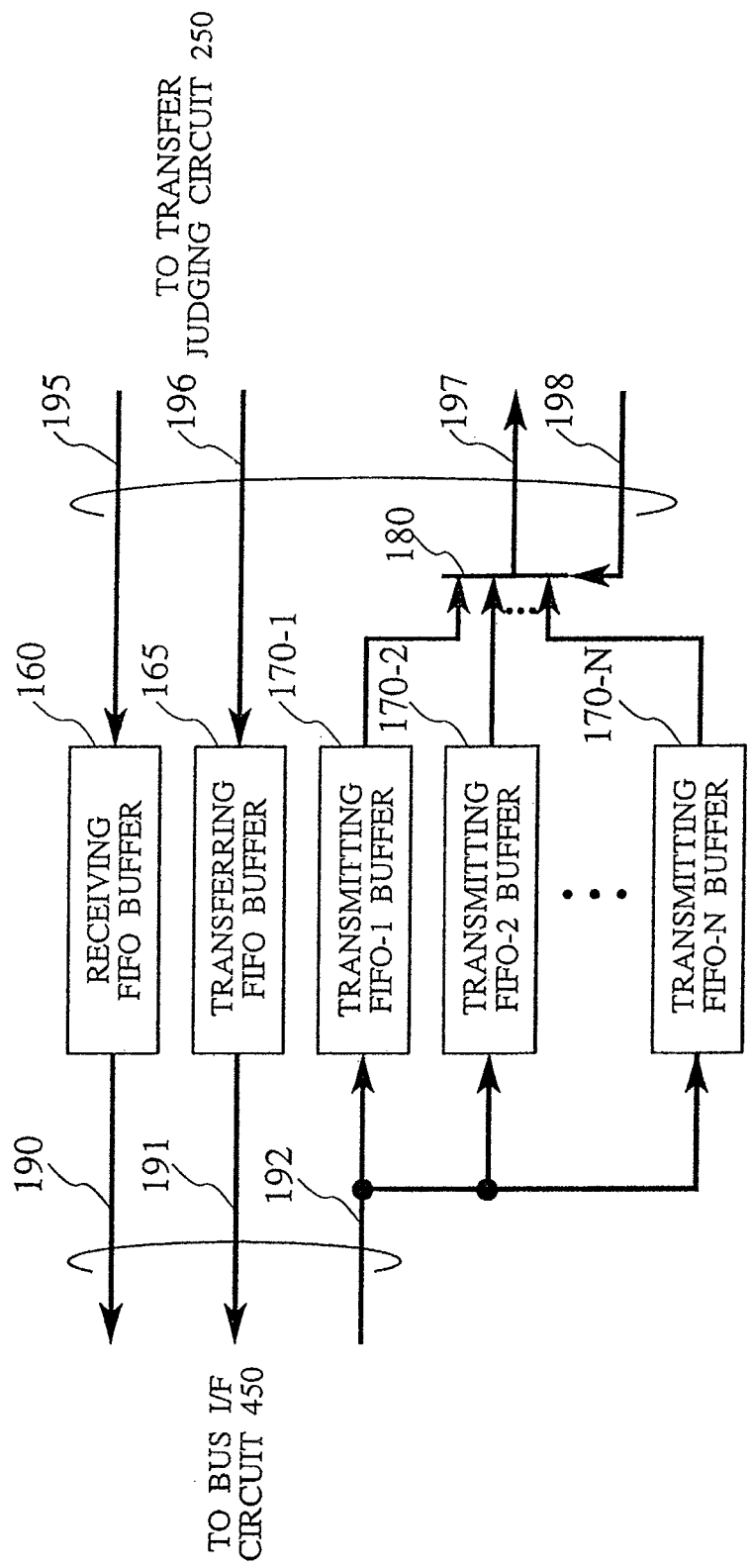

FIG.15

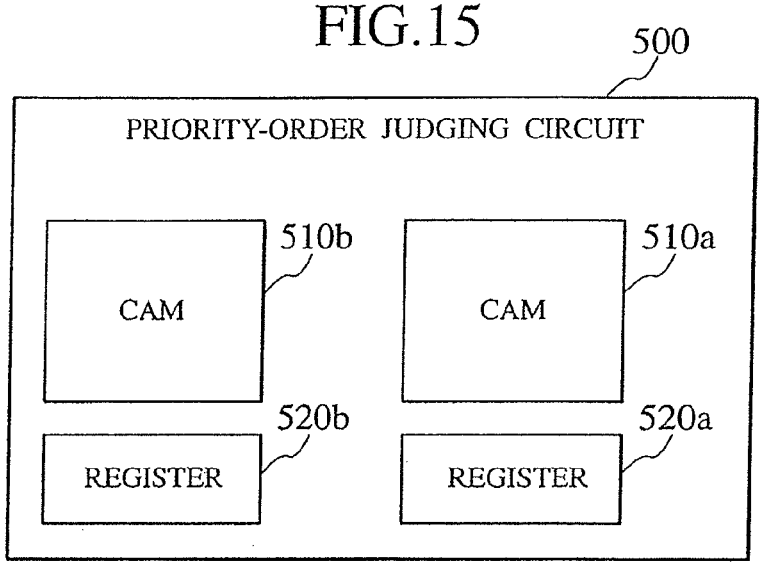

PRIORITY-ORDER JUDGING CIRCUIT
- 510b CAM
- 510a CAM
- 520b REGISTER
- 520a REGISTER

FIG.16

CONTENTS OF CAM 510

| INDEX | IPv4/v6 | COMBINATION OF IP ADDRESS AND PORT | PRIORITY ORDER | WORK AREA |
|---|---|---|---|---|
| 0 | IPv4 | 1.2.3.4 | 1 | 1 |
| 1 | IPv4 | 2.3.4.5 | 2 | N |
| ⋮ | ⋮ | ⋮ | ⋮ | ⋮ |
| K | IPv6 | 1:2:3:4:5:6 | 5 | 3 |

FIG.17

| INDEX | NAME | USE FOR REGISTERS | VALUE LOADED IN REGISTERS |
|---|---|---|---|
| 1 | R5101 | TRANSFERRING OR TRANSMITTING FIFO BUFFER TO WHICH PACKET IS OUTPUT, WHICH IS USED WHEN MAC ADDRESS IS NOT REGISTERED IN CAM 510 | 1 ~ N |
| 2 | R5102 | IP ADDRESS THAT IS NOT REGISTERED IN CAM 510 | IP ADDRESS |
| 3 | R5103 | PORT THAT IS NOT REGISTERED IN CAM 510 | PORT |

| INDEX | NAME | USE FOR REGISTERS | VALUE LOADED IN REGISTERS |
|---|---|---|---|
| 1 | R2701 | PROCESSING EXECUTED WHEN MAC ADDRESS IS NOT REGISTERED IN CAM | RECEIVE, TRANSFER, RECEIVE &TRANSFER |
| 2 | R2702 | THRESHOLD VALUE OF USAGE RATE OF TRANSMITTING FIFO BUFFER, WHICH IS USED FOR PRIORITY SWITCHING | 0 ~ 100 % |
| 3 | R2703 | THRESHOLD VALUE OF USAGE RATE OF TRANSMITTING FIFO BUFFER, WHICH IS USED TO INVOKE FLOW CONTROL | 0 ~ 100 % |

PACKET COMMUNICATION DEVICE, PACKET COMMUNICATION SYSTEM, PACKET COMMUNICATION MODULE, DATA PROCESSOR, AND DATA TRANSFER SYSTEM

This application is a continuation of application Ser. No. 12/010,762, filed Jan. 29, 2008, now U.S. Pat. No. 7,814,223, which is a continuation of application Ser. No. 10/298,520, filed Nov. 19, 2002 (now abandoned), the entirety of which are hereby incorporated by reference.

BACKGROUND OF THE INVENTION

The present invention relates to a packet communication device, a packet communication system, a packet communication module, a data processor, and a data transfer system, each of which comprises at least two network controllers or two data communication channels.

There is known, as a communication device using a packet, a device used for an IP phone, etc., which exchanges audio data using IP (Internet Protocol) on the basis of Ethernet. This kind of packet communication device comprises a CPU, two Ethernet controllers, a transfer control circuit, and a memory. As a method for reducing the number of Ethernet cables which are connected from the HUB, the following method is adopted: one Ethernet controller is connected to a HUB via Ethernet; the other Ethernet controller is connected to a PC (personal computer) via Ethernet; and the HUB is connected to the PC through the communication device. This packet communication device is so devised that if a destination of a packet received via each Ethernet is the communication device, the received packet is processed here just as it is, whereas if a destination of the received packet is not the communication device, the destination is identified, and thereby the packet is transferred to the other Ethernet if necessary. As a result, this kind of packet communication device can transfer a packet transmitted from the HUB, including received electronic mail and Internet information, a destination of which is the PC, to the Ethernet on the PC side; and at the same time, the packet communication device can transfer a packet from the PC side, including transmitted electronic mail and Internet access, to the HUB side. Further, the packet communication device can realize telephone functions by transmitting voice inputted from a handset as audio data, and by outputting received audio data front a speaker as voice. In this case, as packets which are transmitted by the Ethernet controller connected to the Ethernet on the HUB side, there are two kinds of packets: a transmit packet as audio data, which is transmitted by the packet communication device to realize an IP phone; and a transmit packet transmitted from the PC. Therefore, the Ethernet controller on the HUB side requires arbitration processing that arbitrates between a transmit packet and a transfer packet.

In this case, because the IP phone exchanges audio data which requires real-time processing, it is necessary to transmit the audio-data packet in preference to the packet transmitted from the PC side. Accordingly, a transmit packet takes precedence over a transfer packet, and thereby is transmitted on a priority basis. However, the IP phone basically transmits one packet every 10 to 20 ms, which means that the number of transmitted packets is few. Therefore, this seldom hinders a packet from the PC side, which requires real-time processing to a relatively small extent, from being transferred. Nevertheless, when the number of packets from the PC side increases, there is a possibility that a transfer buffer which holds transfer packets will overflow.

For this reason, as described in Japanese Patent Laid-open No. Hei 5-316147, it is possible to transmit a packet (transmit packet), the priority order of which is high, on a priority basis by providing a buffer for holding transmit packets on a priority order basis, and by connecting nodes, which transmit packets held in each buffer in arithmetic progression, in a ring. In addition to it, giving an opportunity of transmission to even a packet (transfer packet), the priority order of which is low, enables the adoption of a configuration that prevents a transmit buffer from overflowing.

In this connection, examples of an external interface circuit of the CPU include an external interface circuit comprising two network controllers. Here, in order to overcome the difference between a communication rate and a data transfer rate on the CPU side, each of the network controllers comprise the following buffers: a transmit buffer that temporarily stores transmit data from the CPU side and gives the transmit data to a network controller; and a receive buffer that temporarily stores reception packet from the network controller and gives the reception packet to the CPU side.

In addition, for the purpose of improving the capability of system processing, and response time, on the CPU side when communication traffic through the network controller increases, the technology that makes the capacity of the transmit buffer and the receive buffer variable is described in each of Japanese Patent Laid-Open Nos. Hei 7-28751, Hei 11-110188, and Hei 6-202974.

SUMMARY OF THE INVENTION

In the prior art, instead of applying the packet communication device to the IP phone, a case where the packet communication device is applied to an IP videophone which transmits video data is not sufficiently considered. If the packet communication device is applied to the IP videophone, there is a possibility that the transfer buffer will overflow.

To be more specific, the IP videophone transmits and receives video data having a large quantity of data in addition to audio data used in the conventional IP phone, thereby increasing the number of packets to be exchanged. In such a situation, the IP videophone transmits a transmit packet transmitted by the IP videophone in preference to transfer of a packet from the PC side. As a result, the transfer of a packet from the PC side is delayed, causing a transfer buffer which temporarily holds packets from the PC side to overflow, which results in occurrence of a packet loss. If a packet loss occurs, a packet is retransmitted to obtain correct information. This causes efficiency in communication of Ethernet to decrease.

On the other hand, in recent years, even in the Internet service where PCs exchange data, in addition to the service such as electronic mail and a home page access, which has no limitation on access time, the Internet service such as video called streaming, Internet television, and relay, which requires real-time processing of communication, is increasing these days. When considering how to cope with such service, packets transmitted from a PC cannot be treated in a lump. Therefore, it is necessary to support QoS (Quality of Service) that manages the priority order on a packet basis in response to the extent to which each service requires real-time processing.

However, under such circumstances, as is the case with the prior art, if a packet loss caused by overflow of a buffer cannot be detected, and if the priority order given to a packet is fixed, it is impossible to assign the priority order to the service which changes at all times.

An object of the present invention is to provide a packet communication device and a packet communication module, which can prevent transfer buffer means from overflowing.

Another object of the present invention is to provide a packet communication device and a packet communication system, which can cope with the service that requires real-time processing.

According to one aspect of the present invention, there is provided a packet communication device, comprising: a plurality of communication means for transmitting and receiving a packet to and from a plurality of communication targets; packet generation processing means for generating a packet to be transmitted by the plurality of communication means, and processing a packet received by the plurality of communication means; transfer buffer means for holding a transfer packet which is used to give and receive information mutually between the plurality of communication targets; and transfer control means for, if it is judged that a packet received by the plurality of communication means is a transfer packet, outputting the received packet to the transfer buffer means, and outputting either a packet generated by the packet generation processing means or a transfer packet held in the transfer buffer means, on a priority basis, to a specified communication means corresponding to a communication target to which the packet is transmitted or transferred; wherein, if a usage rate of the transfer buffer means exceeds a threshold value, the transfer control means makes the priority order of a transfer packet higher than that of a generated packet, and thereby outputs the transfer packet to the specified communication means in preference to the generated packet.

In addition, when configuring the packet communication device, the following function may be added to the transfer control means: judging the packet received by the plurality of communication means to be a packet which should be processed by the packet generation processing means, or to be the transfer packet; and according to the result of the judgment, outputting the received packet to the packet generation processing means or the transfer packet means.

Moreover, when configuring each packet communication device, the following elements can be added.

(1) The transfer control means comprises a priority-order register which can be set by the packet generation processing means. The priority-order register is loaded with a threshold value for changing the priority order, which is related to a usage rate of the transfer buffer means.

(2) If the usage rate of the transfer buffer means exceeds the threshold value for flow control, the transfer control means outputs a flow-control packet to a specified communication means corresponding to a communication target from which transfer is made.

(3) A receiving buffer means which temporarily holds packets received by a plurality of communication means is provided. If a usage rate of the receive buffer means exceeds a threshold value for flow control, the transfer control means outputs a flow-control packet to a specified communication means corresponding to a communication target from which transmission is made.

(4) A flow-control register which can be set by the packet generation processing means is provided. The flow-control register is loaded with a threshold value for flow control relating to a usage rate of the transfer buffer means or a usage rate of the receive buffer means.

According to another aspect of the present invention, there is provided a packet communication module, comprising:

a plurality of communication means for transmitting and receiving a packet to and from a plurality of communication targets; transfer buffer means for holding a transfer packet which is used to give and receive information mutually between the plurality of communication targets; and transfer control means by which if it is judged that a packet received by the plurality of communication means is a transfer packet, the receive packet is output to the transfer buffer means, and either a transmit packet or a transfer packet held in the transfer buffer means is output, on a priority basis, to a specified communication means corresponding to a communication target to which the packet is transmitted or transferred; wherein if a usage rate of the transfer buffer means exceeds a threshold value, the transfer control means makes the priority order of a transfer packet higher than that of a transmit packet, and thereby outputs the transfer packet to the specified communication means in preference to the transmit packet.

Moreover, when configuring the packet communication module, the following elements can be added.

(1) The transfer control means comprises a priority order register which can be set by the packet generation processing means. The priority-order register is loaded with a threshold value for changing the priority order, which is related to a usage rate of the transfer buffer means.

Moreover, in order to attain other objects of the present invention, there is provided a packet communication device, comprising: a plurality of communication means for transmitting and receiving a packet, which includes an IP address and a port as its additional address, to and from a plurality of communication targets; priority-order judging means for, according to a combination of the IP address and the port, judging the priority order relating to the extent to which the packet requires real-time processing; a plurality of transmit buffer means for holding a transmit packet in association with the priority order relating to the extent to which real-time processing is required; and prioritized-packet selecting means for selecting a packet having the highest priority order from among transmit packets held in the plurality of transmit buffer means according to the result of judgment by the priority-order judging means, and outputting the selected packet on a priority basis to a specified communication means corresponding to a communication target to which the packet is transmitted or transferred.

In addition, when configuring the packet communication device, the following function can be added to the transfer control means; judging a packet received by the plurality of communication means to be a packet which should be processed by the packet generation processing means, or to be a transfer packet; and according to the result of the judgment, outputting the received packet to the packet generation processing means or a transfer buffer means.

Moreover, when configuring the packet communication device, the following elements can be added.

(1) If a usage rate of one of the plurality of transmit buffer means exceeds a threshold value, the prioritized-packet selecting means outputs a packet held in the transmit buffer means, in which the threshold value is exceeded, to a specified communication means in preference to other packets.

(2) The prioritized-packet selecting means comprises a register which can be set by the packet generation processing means. The register is loaded with a threshold value relating to a usage rate of the transfer buffer means.

According to another aspect of the present invention, there is provided a packet communication system, comprising: a plurality of packet communication devices for transmitting and receiving a packet which includes an IP address and a port as its additional address; and a priority-order control unit for, according to a combination of the IP address and the port, determining the priority order relating to the extent to which real-time processing is required by a packet transmitted and received between a plurality of packet communication devices; wherein the plurality of packet communication devices are connected to one another in series.

When configuring the packet communication system, as the plurality of packet communication devices, packet communication devices for transmitting and receiving a packet which includes an IP address and a port as its additional address can be used.

According to the above-mentioned means, when transmitting a transmit packet in preference to transfer of a transfer packet, if a usage rate of the transfer buffer means exceeds a threshold value, the priority of the transfer packet is made higher than that of the transmit packet (generated packet). As a result, the transfer packet is output to the specified communication means in preference to the transmit packet. Therefore, it is possible to prevent the transfer buffer means from overflowing.

In this case, if a usage rate of the transfer buffer means becomes a threshold value or less, the transmit packet is transmitted on a priority basis. Therefore, it is possible to prevent efficiency in transmission of transmit packets from decreasing.

In addition, when a judgment is made as to whether or not a received packet is a transfer packet, the judgment on the basis of an address (MAC address) added to the received packet enables a reduction in load on the packet generation processing means.

On the other hand, when transmitting and receiving a packet that includes an IP address and a port as its additional address, the priority order of a packet to be transmitted and received is determined on the basis of a combination of at the IP address and the port, according to the extent to which the packet requires real-time processing. Therefore, a packet can be transmitted and received in response to contents of service which change every moment, which ensures successful real-time processing.

To be more specific, selecting a packet having the highest priority order from among transmit packets held in the plurality of transmit buffer means according to the result of judgment by the priority-order judging means, and outputting the selected packet on a priority basis to a specified communication means corresponding to a communication target to which the packet is transmitted or transferred, ensure successful real-time processing.

Moreover, in the present invention, as an external interface circuit of a CPU, an external interface circuit comprising two network controllers was examined. It is possible to prevent data transmission from disturbing each other by connecting a network, for exclusively transmitting data such as audio data, which requires real-time processing, to one of the two network controllers, and by connecting a network, which transmits at a time a large quantity of data such as file data, to the other network. On the assumption that those network controllers are used in such a manner, as a matter of course, there is a case where data transmission is performed between networks, features of which are different from each other. In the prior art, data from one network controller is accumulated in a memory of a CPU through a reception buffer. Then, an address, etc., of the data are judged by the CPU. According to the result of the judgment, the data is transmitted from a transmit buffer to another network through the other network controller. However, if such steps are used, transmission to a terminal which should receive the data is delayed, causing system performance to decrease.

For this reason, this inventor examined an addition of a transfer buffer which works as a bypass that permits transmission data to be transferred between one network controller and the other. This technology is not publicly known. In the process of the examination, this inventor found problems as described below.

The first problem is the difference in transmission rate between networks which are connected to both network controllers (for example, 10 Mbps and 100 Mbps). When transferring communication data from a network controller on a network, a transmission rate of which is high, to a network controller on a network, a transmission rate of which is low, if the capacity of a transfer buffer placed between the network controllers is not sufficient, overflow of data from the network operating at a high transmission rate occurs.

The second problem is how to cope with concentration of communication data in one network controller. For example, this is a case where a transmission request from the CPU side conflicts with a bypass request from the other network controller side at one network controller. Thus, when transmission requests from a plurality of transmission request senders conflict with each other, if the capacity of the buffer is not sufficient, while responding to one transmission, data overflow occurs on the other transmission request sender.

If such data overflow occurs, overflowed data is disposed, which means a loss of data in a terminal that receives the data. In this case, if the lost data is voice or image information, the loss is recognized as sound skipping or irregularities of video. If information does not allow a loss of data, retransmission of data is requested. Such retransmitted data results in overhead of communication, causing a degree of congestion to increase, instead of reducing the amount of communication data.

Another object of the present invention is to provide a data processor that can improve the efficiency in data transmission between networks, features of which are different from each other.

In addition, another object of the present invention is to provide a data processor and a data transfer system which can prevent a buffer placed between network controllers from overflowing data of the fast network side during data transmission from a network operating at high transmission rate to a network operating at a low transmission rate.

Further, another object of the present invention is to provide a data processor and a data transfer system by which when transmission requests which pass through one network controller conflict with each other, while responding to one transmission request, a buffer can be prevented from overflowing with transmission data from the other transmission request side.

The above-mentioned and other objects of the present invention, and new features thereof, will be made clear by description in this specification and with reference to attached drawings.

Outlines of typical features of the present invention disclosed in this application concerned will be briefly described below.

[1] A data processor (2001) according to the present invention comprises a CPU (2002), and an external interface circuit connected to an internal bus which can be connected to the CPU (2024). The external interface circuit comprises the following: a plurality of network controllers (2040, 2041); transmitting and receiving FIFO (First-In First-Out) buffers (2042 through 2045) that are connected to each of the network controllers, and that temporarily store transmit data and receive data; and transferring FIFO buffers (2046, 2047) that interconnect the network controllers, and that temporarily store transfer data which is transferred between the network controllers. In response to an address included in the information received from outside, the network controller can control received information so that the received information is distributed to the transmitting and receiving FIFO buffer or the transferring FIFO buffer.

According to the above-mentioned means, it is possible to prevent data transmission from disturbing each other by connecting a network for exclusively transmitting data such as audio data, which requires real-time processing, to one of the network controllers, and by connecting a network, which transmits at a time a large quantity of data such as file data, to the other network controller. In this case, if data transmission is performed between both of the networks, features of which are different from each other, data can be directly transmitted from one network to the other network without performing processing on the CPU side. Therefore, it is possible to avoid a situation in which as is usual with the conventional method, data transmission between networks is delayed, causing system performance to be decreased.

If attention is paid to the difference in transmission rate between networks which are connected to both network controllers (for example, 10 Mbps and 100 Mbps), as for the transferring FIFO buffer, it is desirable that the storage capacity of a buffer areas used in a direction from one network controller to the other network controller, and the storage capacity of another buffer areas used in the reverse direction, are variable. This can avoid the following situation: when transferring communication data from a network controller on a network, a transmission rate of which is high, to a network controller on a network, a transmission rate of which is low, if the capacity of a transfer buffer placed between the network controllers is not sufficient, overflow of data from the network operating at a high transmission rate occurs.

For the storage capacity variable control of the buffer areas, the network controller may control the storage capacity of both buffer areas of the transferring FIFO buffer so that they are variable according to buffer size information. For example, the buffer size information is specified in the network, controller by program control of the CPU. The specified buffer size of a buffer connected to a network a transfer rate of which is high may be made larger.

From the viewpoint of how to cope with the concentration of communication data in one network controller, dynamic variable control of the storage capacity of buffer areas is effective. To be more specific, with reference to a FIFO buffer size specified in the buffer size information, as a result of comparison between the storage capacity of a buffer area used in a direction from one network controller to the other network controller and the storage capacity of another buffer area used in the reverse direction, if the storage capacity of an unoccupied part in one of the buffer areas is decreasing, the network controller performs FIFO control by adding an unoccupied area of the other buffer area to the buffer area where the storage capacity of the unoccupied part is decreasing.

If such dynamic variable control is used, when a transmission request from the CPU side conflicts with a bypass request from the other network controller side for one network controller for example, causing transmission requests from a plurality of transmission request senders to conflict with each other, it is possible to reserve sufficient capacity of a buffer for one transmission request side while responding to another transmission, which prevents overflow of data from occurring.

[2] A data transfer system according to the present invention comprises the following: a plurality of data communication channels (2040, 2041); transmitting and receiving FIFO buffers (2042 through 2045) that are connected to each data communication channel, and that temporarily stores transmit data and receive data; and transferring FIFO buffers (2046, 2047) that interconnect the data communication channels, and that temporarily store data transferred between the data communication channels in buffer areas. Here, it is possible to control the storage capacity of the buffer areas in such a manner that the storage capacity of a buffer area used in a direction from a data communication channel (where a data communication rate of communication to and from an external device connected to this data communication channel is high) to a data communication channel (where a data communication rate of communication to and from an external device connected to this data communication channel is low) is made larger than the storage capacity of another buffer area used in the reverse direction. This can avoid the following situation: when transferring communication data from a network controller on a network, a transmission rate of which is high, to a network controller on a network, a transmission rate of which is low, if the capacity of a transfer buffer placed between the network controllers is not sufficient, overflow of data from the network operating at a high transmission rate occurs.

For the storage capacity variable control of the buffer areas, the network controller may control the storage capacity of both buffer areas of the transferring FIFO buffer so that they are variable according to buffer size information. For example, the buffer size information is specified in the network controller by program control of the CPU.

From the viewpoint of how to cope with the concentration of communication data in one network controller, dynamic variable control of the storage capacity of buffer areas is effective. To be more specific, with reference to a FIFO buffer size specified in the buffer size information, as a result of comparison between the storage capacity of a buffer area used in a direction from one data communication channel to the other communication channel and the storage capacity of another buffer area used in the reverse direction, if the storage capacity of an unoccupied part in one of the buffer areas is decreasing, the data communication channel performs FIFO control by adding an unoccupied area of the other buffer area to the buffer area where the storage capacity of the unoccupied part is decreasing, so that dynamic variable control of the storage capacity becomes possible.

BRIEF DESCRIPTION OF THE DRAWINGS

FIG. 1 is a block configuration diagram illustrating a 2-channel Ethernet communication device according to a first embodiment of the present invention;

FIG. 2 is a block configuration diagram illustrating a communication network which uses a 2-channel Ethernet communication device according to the present invention;

FIG. 7 is a configuration diagram illustrating registers;

FIG. 8 is a configuration diagram illustrating CAMs;

FIG. 9 is a diagram illustrating selection conditions of a selector in a transfer judging circuit;

FIG. 10 is a flowchart illustrating packet transmission processing;

FIG. 11 is a flowchart illustrating packet receive and transfer processing;

FIG. 14 is a block configuration diagram illustrating a buffer;

FIG. 15 is a block configuration diagram illustrating a priority-order judging circuit;

FIG. 16 is a configuration diagram illustrating CAMs;

FIG. 17 is a configuration diagram illustrating registers;

DESCRIPTION OF THE PREFERRED EMBODIMENTS

Embodiments of the present invention will be described with reference to drawings below.

FIG. 1 is a block diagram illustrating a configuration of a packet communication device according to one embodiment of the present invention. FIG. 2 is a block diagram illustrating a configuration of a packet communication system. This configuration is used when the packet communication device according to the present invention is applied to a 2-channel ethernet network. In FIG. 2, a 2-channel Ethernet communication device 800 as a packet communication device has communication paths (communication means) equivalent to two channels. The communication paths, each of which corresponds to each channel, are connected to Ethernet 820a, 820b through PHY (Physical layer transceiver) 810a, 810b, respectively. Ethernet communication devices 830a, 830b, each of which comprises a PC (personal computer), are connected to the Ethernet 820a, 820b, respectively. Each of the Ethernet 820a, 820b is configured to operate independently. The Ethernet communication devices 830a, 830b are so devised that transmitting and receiving an Ethernet packet (hereinafter referred to as a packet) according to the standards, that is to say, IEEE802.3 and IEEE802.1Q/D, via the Ethernets 820a, 820b enables communication between the devices. When transmitting and receiving a packet between the communication device 830a and the communication device 830b, the packet is transmitted and received via the Ethernet 820a, the Ethernet communication device 800, and the Ethernet 820b. In this case, the 2-channel Ethernet communication device 800 transmits and receives a packet, and has a function of transferring a packet between the Ethernets 820a and 820b. This enables communication between the communication device 830a and the communication device 830b through the 2-channel Ethernet communication device 800.

Figure 3:
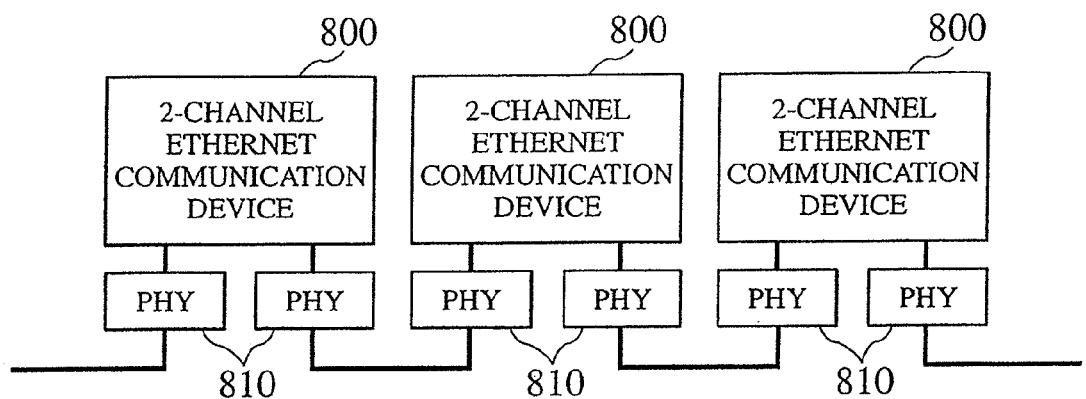
FIG. 3 is a diagram illustrating a system configuration used when a plurality of 2-channel Ethernet communication devices are connected in series.
Figure 4:
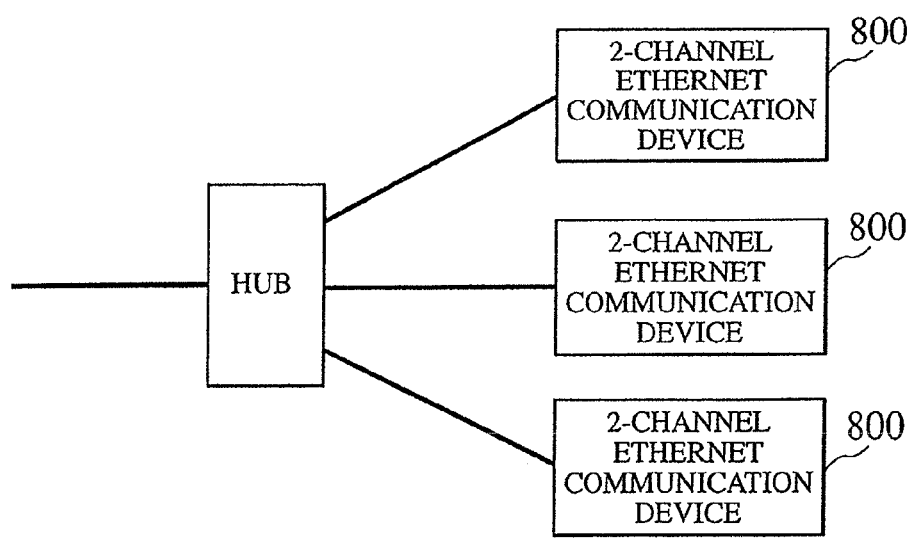
FIG. 4 is a diagram illustrating a system configuration used when a plurality of Ethernet communication devices are connected to a HUB.

If a plurality of 2-channel Ethernet communication devices 800 are connected to one another, connecting them in series via the Ethernet as shown in FIG. 3 enables a reduction in wiring length to a large extent as compared with a case where the 2-channel. Ethernet communication devices 800 are connected to one another via a HUB as shown in FIG. 4.

A specific configuration of the 2-channel Ethernet communication device 800 will be described below. As shown in FIG. 1, the 2-channel Ethernet communication device 800 comprises the following: a CPU 1; a memory 2; a 2-channel Ethernet communication module 4 (hereinafter referred to as the 2-channel communication module); and a bus 3 through which they are interconnected. The 2-channel communication module 4 comprises the following: a bus I/F (interface) circuit 400; two buffers 100a, 100b; two Ethernet MAC (Media Access Control) units 300a, 300b; and a transfer judging circuit 200. The MAC unit 300a is connected to the Ethernet device 830a via the PHY 810a and the Ethernet 820a so that a packet can be transmitted and received between the MAC unit 300a and the Ethernet device 830a. In other words, the MAC unit 300a is configured as a communication means that transmits and receives a packet to and from the Ethernet device 830a as a communication target via the PHY 810a and the Ethernet 820a.

On the other hand, the MAC unit 300b is connected to the Ethernet device 830b via the PRY 810b and the Ethernet 830b so that a packet can be transmitted and received between the MAC unit 300b and the Ethernet device 830b. In other words, the MAC unit 300b is configured as a communication means that transmits and receives a packet to and from the Ethernet device 830b as a communication target via the PHY810b and the Ethernet 820b.

In this case, in the 2-channel communication module 4 and the 2-channel communication device 800, packets which are transmitted and received by the MAC units 300a, 300b are classified into three kinds—transmit, receive, and transfer. For this reason, in order to avoid confusion, hereinafter a case where the 2-channel communication device 800 and the 2-channel communication module 4 transmit/receive a packet is designated as transmission (transmit), reception (receive), or transmission and reception; and a case where the MAC units 300a, 300b transmit/receive a packet is designated as transmission (transmit), reception (receive), or transmission and reception of a packet.

Figure 5:
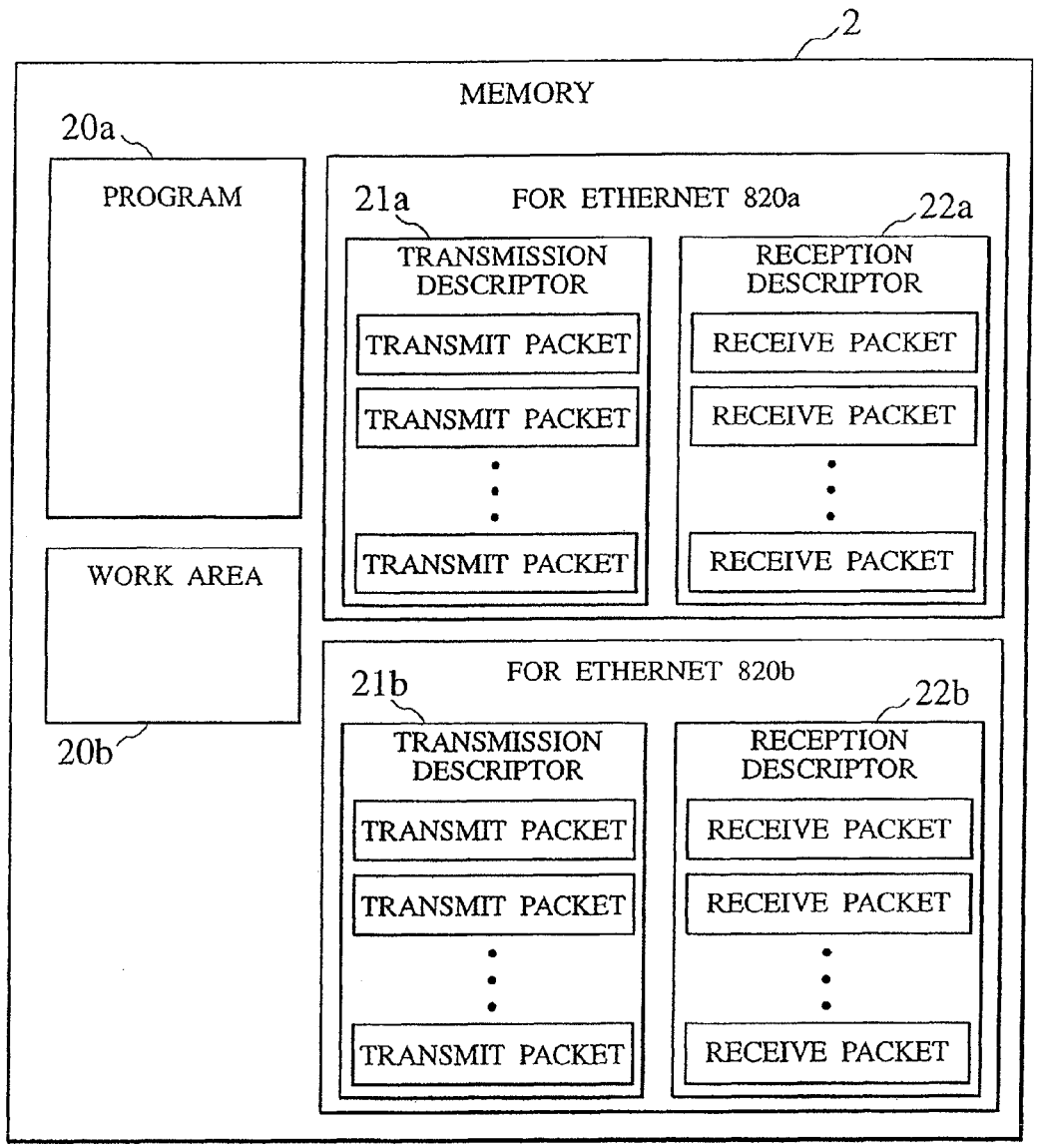
FIG. 5 is a block configuration diagram illustrating a memory.

As shown in FIG. 5, the memory 2 comprises the following: a program 20a executed by the CPU 1; a work area 20b which holds a running state of the program 20*a*; a transmission descriptor 21*a* (21*b*) which holds a packet to be transmitted to the Ethernet 820*a* (820*b*) by the 2-channel communication device 800; and a reception descriptor 22*a* (22*b*) which holds a packet received from the Ethernet 820*a* (820*b*).

On the other hand, the CPU 1 is devised to perform the following: accessing the memory 2 and the 2-channel communication module 4 through the bus 3; executing the program 20*a* which is written into the memory 2; accessing a state (register) of the 2-channel communication module 4; reading a received packet, which is held in the reception descriptor 22*a* (22*b*) in the memory 2, to process the received packet; generating a transmit packet; and writing the generated transmit packet into the transmission descriptor 21*a* (21*b*) in the memory 2. In other words, the CPU 1 is configured as a packet generation processing means that generates a transmit packet to be transmitted by the MAC units 300*a*, 300*b*, and that processes a packet which has received by the MAC units 300*a*, 300*b*.

Figure 6:
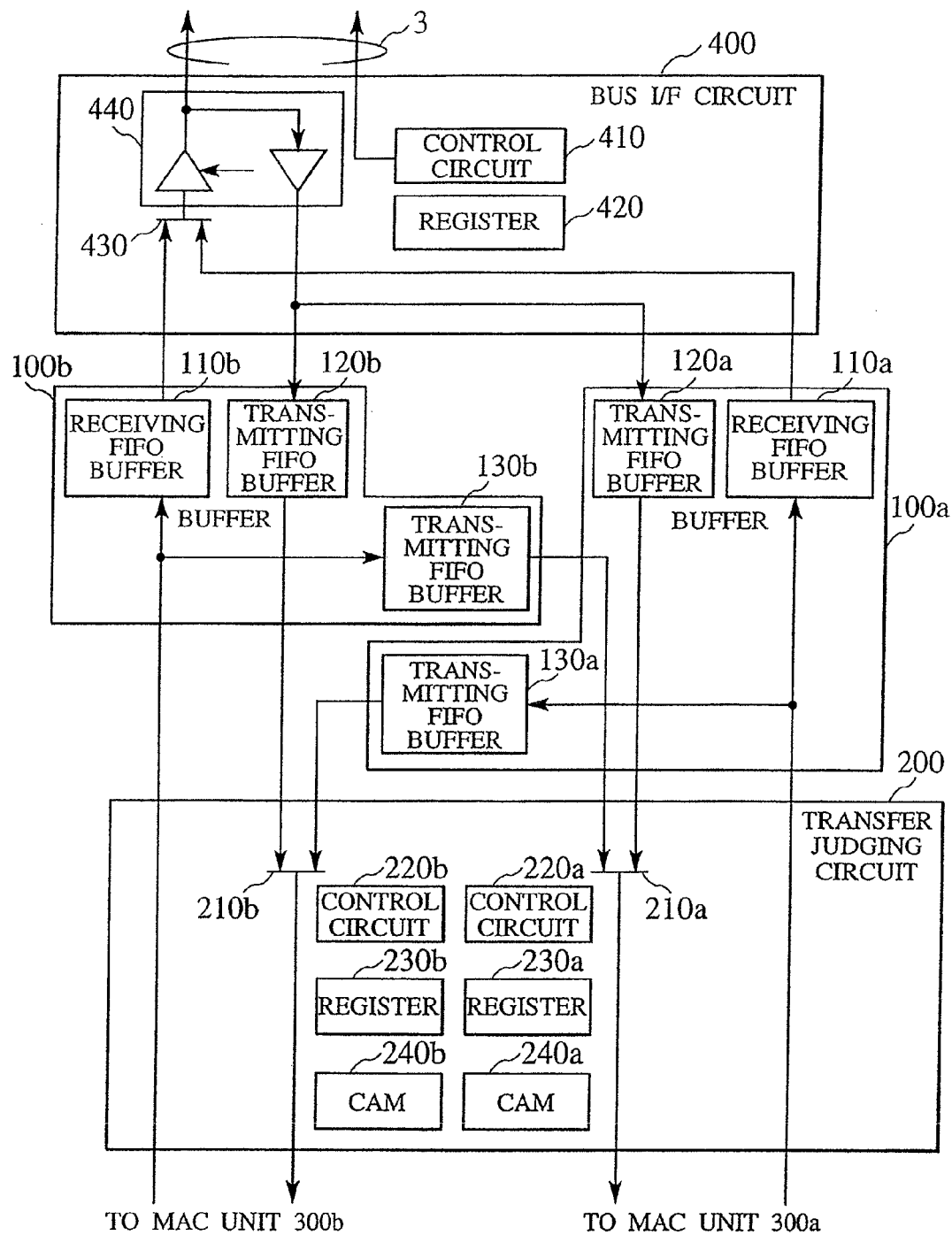
FIG. 6 is a block configuration diagram illustrating a bus I/F circuit, a buffer, and a transfer judging circuit.

FIG. 6 is a diagram illustrating how the bus I/F circuit 400, the buffers 100*a*, 100*b*, and the transfer judging circuit 200 are specifically configured. The bus I/F circuit 400 comprises the following: an input/output buffer 440; a selector 430; a control circuit 410 for controlling the input/output buffer 440 and the selector 430; and a register 420. The selector 430 is devised to select a packet which is output by receiving FIFO (First In First Out) units 110*a*, blob of the buffers 100*a*, 100*b* before outputting the selected packet to the input/output buffer 440. The input/output buffer 440 is devised to output the packet, which has received from the bus 3, to a transmitting FIFO buffer 120*a* (120*b*) of the buffer 100*a* (100*b*). To be more specific, the control circuit 410 monitors the transmission descriptors 21*a*, 21*b* in the memory 2; and as soon as the CPU 1 registers a packet in the transmission descriptor 21*a* (21*b*), the control circuit 410 transfers the packet, which has been registered in the transmission descriptor 21*a* (21*b*), to the transmitting FIFO buffer 120*a* (120*b*) through the bus 3 while keeping the input/output buffer 440 in an Input state.

In a similar manner, the control circuit 410 monitors the receiving FIFO buffers 110*a*, 110*b*; and as soon as a packet is written into the receiving FIFO buffer 110*a* (110*b*) through the transfer judging circuit 200, the control circuit 410 instructs the selector 430 to select a packet which is output by the receiving FIFO buffer 110*a* (110*b*) while keeping the input/output buffer 440 in an output state, and then transfers a selected packet to the reception descriptor 22*a* (22*b*) in the memory 2 through the bus 3.

The buffer 100*a* comprises the following; the receiving FIFO buffer 110*a* that temporarily holds a received packet; the transmitting FIFO buffer 120*a* that temporarily holds a packet to be transmitted; and transferring FIFO buffer 130*a* that is used to transfer a packet between the MAC unit 300*a* and the MAC unit 300*b*. In a similar manner, the buffer 100*b* comprises the following: the receiving FIFO buffer 110*b* that temporarily holds a received packet; the transmitting FIFO buffer 120*b* that temporarily holds a packet to be transmitted; and transferring FIFO buffer 130*b* that is used to transfer a packet between the MAC unit 300*a* and the MAC unit 300*b*. In other words, the transferring FIFO buffers 130*a*, 130*b* are configured as transfer buffer means for holding a packet to be transferred, which is used to give and receive information mutually between the Ethernet devices 830*a* and 830*b*. It is so devised that the transferring FIFO buffer 130*a* holds a packet to be transferred from the Ethernet device 830*a* to the Ethernet device 830*b*, and that the transferring FIFO buffer 130*b* holds a packet to be transferred from the Ethernet device 830*b* to the Ethernet device 830*a*.

The transfer judging circuit 200 comprises the following: control circuits 220*a*, 220*b* that control the selectors 210*a*, 210*b* and the buffers 100*a*, 100*b*; registers 230*a*, 230*b* that hold a state of the transfer judging circuit 200; CAMs (Content Addressable Memory) 240*a*, 240*b* for holding judgment information used to decide which processing to perform, that is to say, receiving the packet, which has been received by the MAC unit 300*a* or 300*b*, by the 2-channel communication device 800 and the 2-channel communication module 4, or transferring the packet to the other MAC unit 300*a* or 300*b*; the selector 210*a* for selecting a packet received from the transmitting FIFO buffer 120*a* or a packet received from the transferring FIFO buffer 130*b* to output the selected packet to the MAC unit 300*a*; and the selector 210*b* for selecting a packet received from the transmitting FIFO buffer 120*b* or a packet received from the transferring FIFO buffer 130*a* to output the selected packet to the MAC unit 300*b*.

As shown in FIG. 7, each of the registers 230*a*, 230*b* comprises six registers R2301 through R2306. The register R2301 is a register used to set processing (receive, transfer, receive & transfer, discard) that is executed when a destination MAC address of a packet received by the MAC unit 300*a* is not registered in the CAM 240*a* or a destination MAC address of a packet received by the MAC unit 300*b* is not registered in the CAM 240*b*. The register R2302 is a register that is usually used to select on a priority basis the transmitting FIFO buffer 120*a* or the transferring FIFO buffer 130*a* for a packet transmitted by the MAC unit 300*a*, or is a register that is usually used to select on a priority basis the transmitting FIFO buffer 120*b* or the transferring FIFO buffer 130*b* for a packet transmitted by the MC unit 300*b*. In general, the transmitting FIFO buffer 120*a* or 120*b* is selected. The register R2303 is a register used to set a threshold value of a usage rate of the transmitting FIFO buffer 120*a* or 120*b* (threshold value for changing the priority order), which is used for priority switching. In a similar manner, the register R2304 is a register used to set a threshold value of a usage rate of the transferring FIFO buffer 130*a* or 130*b* (threshold value for changing the priority order), which is used for priority switching. The register R2305 is a register used to set a threshold value of a usage rate of the receiving FIFO buffer 120*a* or 120*b* (threshold value for flow control), which invokes the flow control. In a similar manner, the register R2306 is a register used to set a threshold value of a usage rate of the transferring FIFO buffer 130*a* or 130*b* (threshold value for flow control), which invokes the flow control. A selectable threshold value for each of the registers R2303 through R2306 is from 0 to 100%. If 0% is specified, this threshold value setting is disabled. In addition, it is so devised that the CPU 1 sets each threshold value.

Each of the CAMs 240*a*, 240*b* comprises a special memory called a content-addressable memory. As shown in FIG. 8, each entry is provided with the following: a MAC address; processing information which specifies processing corresponding to the MAC address, that is to say, receive, transfer, receive & transfer, or discard; and a work area. It is so devised that a MAC address is inputted as a substitute for an address to output processing information of an entry having a MAC address which is coincident with the inputted MAC address. Additionally, the work area is used when the CPU 1 updates the entry. Moreover, when a plurality of entries are coincident with the MAC address, a processing number of the entry, an index number of which is smallest, is output. The CPU 1 sets and Updates entries of the CAMs 240*a*, 240*b*.

The CAM 240*a* (240*b*) according to the above-mentioned configuration are used to check a packet received by the MAC unit 300*a* (300*b*) to see what its processing is (receive, transfer, receive & transfer, or discard) judging from a destination MAC address of the packet. To be more specific, if the communication system shown in FIG. 2 is built, a MAC address is set for each of the Ethernet device 830a, the Ethernet device 830b, and the 2-channel Ethernet communication device 800 as an address peculiar to each device. Accordingly, if a destination MAC address of a packet transmitted from the Ethernet device 830a is a destination MAC address of the Ethernet device 830b, it is found out that the packet received by the 2-channel Ethernet device 800 is a packet to be transferred to the Ethernet device 830b. In addition, if a destination MAC address of a packet transmitted from the Ethernet device 830a is a destination MAC address for the 2-channel Ethernet communication device 800, the packet can be judged to be a packet which the 2-channel Ethernet communication device 800 should receive.

For example, if a MAC address of index0 is inputted into the 2-channel Ethernet communication device 800, this packet is judged to be a packet which should be transferred to the Ethernet device 830a or the Ethernet device 830b. If a packet having a MAC address corresponding to indexN is received, the packet can be judged to be a packet which the 2-channel Ethernet communication device 800 should receive. In this case, if there is no entry having a matched MAC address, receive, transfer, receive & transfer, or discard is set by the register R2301.

In the transfer judging circuit 200 according to the above-mentioned configuration, the control circuit 220a (220b) always checks a usage rate of the receiving FIFO buffer 110a (110b), the transmitting FIFO buffer 1208 (120b), and the transferring FIFO buffer 130a (130b), and thereby invokes the flow control. As shown in FIG. 9, the control circuit 220a (220b) switches the selector 210a (210b), and determines how to process a packet received by the MAC unit 300a (300b)—receive, transfer, receive & transfer, or discard.

In the first place, when invoking the flow control, if a usage rate of the receiving FIFO buffer 110a (110b) exceeds a threshold value specified by the register R2305, or if a usage rate of the transferring FIFO buffer 130a (130b) exceeds a threshold value specified by the register R2306 in like manner, a packet for flow control is transmitted to the MAC unit 300a (300b). When the flow-control packet is transmitted, the packet received by the MAC unit 300a (300b) is prevented from being unprocessed and discarded. The packet is unprocessed and discarded when the number of packets received by the MAC unit 300a (300b) exceeds the number of packets which can be received and transferred by the 2-channel communication device 800. To be more specific, if the number of packets received by the MAC unit 300a (300b) exceeds the number of packets which can be received and transferred by the 2-channel communication device 800, it is possible to prevent the packet from being discarded by instructing a device which transmits the packet to stop the packet transmission temporarily.

Next, the control circuit 220a (2203b) monitors usage rates of the transmitting FIFO buffer 220k (220b) and the transferring FIFO buffer 130a (130b) to control switching of the selector 210a (210b). Usually, more specifically, if a usage rate of the transmitting FIFO buffer 120a (120b) is smaller than or equal to a threshold value specified by the register R2303, and if a usage rate of the transferring FIFO buffer 130a (130b) is smaller than or equal to a threshold value specified by the register R2304, a packet which is output from the FIFO buffer specified by the register R2302 is selected by the selector 210a (210b). On the other hand, if only a usage rate of the transmitting FIFO buffer 120a (120b) exceeds a threshold value specified by the register R2303, a packet which is output from the transmitting FIFO buffer 120a (120b) is selected by the selector 210a (210b). In contrast with this, if only a usage rate of the transferring FIFO buffer 130a (130b) exceeds a threshold value specified by the register R2304, a packet which is output from the transferring FIFO buffer 130a (130b) is selected by the selector 210a (210b). Therefore, if a higher priority is given to the transmitting FIFO buffer 120a (120b) according to the register R2302, many transmit packets are transferred from the transmission descriptor 21a (21b) to the transmitting FIFO buffer 120a (120b). To be more specific, because transmit packets are transmitted on a priority basis, transmission of transfer packets is delayed, which prevents overflow of the transferring FIFO buffer 130a (130b) from occurring.

In addition, the control circuit 220a (220b) sends an inquiry to the CAN 240a (240b) about a destination MAC address of the packet received by the MAC unit 300a (300b) to check a kind of processing to be performed—receive, transfer, receive & transfer, or discard. If receive is performed, the packet received by the MAC unit 300a (300b) is written into the receiving FIFO buffer 110a (110b). If transfer is performed, the packet is written into the transferring FIFO buffer 130a (130b). If receive & transfer are performed, the packet is written into both of the receiving FIFO buffer 110a (110b) and the transferring FIFO buffer 130a (130b). If discard is performed, the packet is written into neither the receiving FIFO buffer 110a (110b) nor the transferring FIFO butter 130a (130b), and is discarded just as it is.

Next, transmission processing of a packet will be described with reference to FIG. 10. In the 2-channel communication device 800 and the 2-channel communication module 4, if a packet is transmitted, when the 2-channel communication module 4 is started by the CPU 1, a transmit packet is read from the transmission descriptor 21a (21b) in the memory 2 by the control of the control circuit 410 of the bus I/F circuit 400. Then, the transmit packet is written into the transmitting FIFO buffer 120a (120b). Ater that, the packet data is read from the transmitting FIFO buffer 120a (120b) to transmit the packet data to the Ethernet 820a (820b).

Next, as shown in FIG. 11, if a packet is received and transferred, as soon as the MAC unit 300a (300b) receives a packet, the transfer judging circuit 200 checks a destination MAC address of the packet, and judges the packet to be a packet which should be received or a packet which should be transferred. If the packet is judged to be a packet which should be received, the packet is written into the receiving FIFO buffer 110a (110b). In response to this, the Bus I/F circuit 400 reads the packet from the receiving FIFO buffer 110a (110b), and than writes this packet into the reception descriptor 22a (22b) in the memory 2 through the bus 3.

On the other hand, if the packet is transferred, the transfer judging circuit 200 writes the packet received by the MAC unit 300a (300b) into the transferring FIFO buffer 130a (130b). In response to this, the MAC unit 300b (300a) reads the packet from the transferring FIFO buffer 130a (130b), and then transmits the packet to the Ethernet 820b (820a).

In this case, the packets transmitted by the MAC unit 300a (300b) are packets from the transmitting FIFO buffer 120a (120b) and the transferring FIFO buffer 130b (130a). The transfer judging circuit 200 performs arbitration as to which packet should be transmitted on a priority basis, the packet from the transmitting FIFO buffer 120a (120b) or that from the transferring FIFO buffer 130b (130a). Usually, the packet in the transmitting FIFO buffer 120a (120b) is transmitted on a priority basis. However, if packets are transferred from the transmission descriptor 21a (21b) to the transmitting FIFO buffer 120a (120b) in succession, the packet in the transmitting FIFO buffer 120*a* (120*b*) is transmitted on a priority basis. Accordingly, transmission of the packet in the transferring FIFO buffer 130*a* (130*b*) is delayed, causing the flow control to be invoked, and causing a transfer buffer to overflow. As a result, efficiency in communication of the Ethernet 820*a* (820*b*) is decreased.

For this reason, the transfer control circuit 200 according to this embodiment always monitors usage rates of the transmitting FIFO buffers 120*a*, 120*b* and the transfer FIFO buffers 130*a*, 130*b*. If the usage rate of the transferring FIFO buffer 130*a* (130*b*) exceeds a predetermined threshold value (threshold value for changing the priority order), a packet in the transferring FIFO buffer 130*a* (130*b*) is transmitted in preference to a packet in the transmitting FIFO buffer 120*a* (120*b*) to avoid overflow of the transferring FIFO buffer 130*a* (130*b*). This prevents efficiency in communication of Ethernet 820*a*, 820*b* from being decreased.

To be more specific, the transfer judging circuit 200 and the bus I/F circuit 400 are configured as transfer control means by which if a usage rate of the transferring FIFO buffer 130*a* (130*b*) exceeds a threshold value (threshold value for changing the priority order), the priority order of the transferring FIFO buffer 130*a* (130*b*) is made higher than that of a transmit packet generated by the CPU 1, and a transfer packet is output to the specified MAC unit 300*a* or 300*b* in preference to the transmit packet.

Thus, according to this embodiment, it is so devised that if a usage rate of the transferring FIFO buffer 130*a* (130*b*) exceeds a threshold value, the priority order of a transfer packet is made higher than that of a transmit packet, and in preference to the transmit packet, the transfer packet is output to the specified communication means. Therefore, it is possible to avoid overflow of the transferring FIFO buffer 130*a* (130*b*), and thereby to prevent efficiency in communication of Ethernet 820*a*, 820*b* from being reduced.

As a result of the processing described above, the 2-channel communication module 4 can realize processing of packet transmission, packet receiving, and packet transfer.

Figure 12:
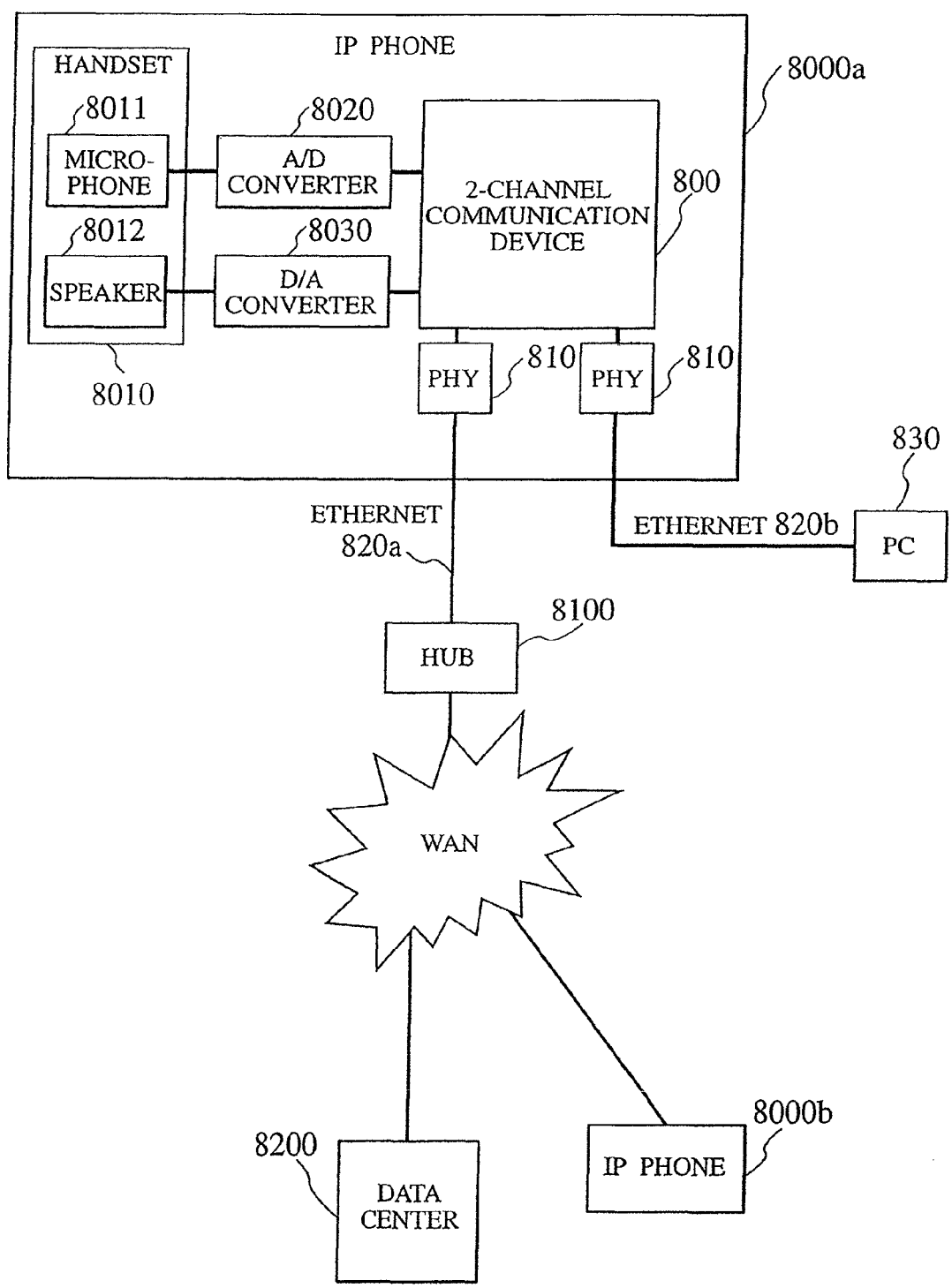
FIG. 12 is a configuration diagram illustrating a communication system used when a 2-channel Ethernet communication device is applied to an IP phone.

Next, an embodiment of a packet communication system obtained when a packet communication device according to the present invention is applied to an IP phone will be described with reference to FIG. 12.

An IP phone 8000*a* is connected to two Ethernets 820*a*, 820*b*. One Ethernet 820*a* is connected to a HUB 8100 which is connected to the Internet and intranets. The other Ethernet 820*b* is connected to a PC as an Ethernet communication device 830. The HUB 8100 is connected to an IP phone 8000*b*, and a data center 8200 that holds home page data, via a WAN (Wide Area Network) including the Internet and intranets.

Each IP phone 8000 comprises the following; a 2-channel communication device 800; two PHYs 810*a*, 810*b*; a handset 8010, an A/D converter 8020 for converting an audio input signal which is an analog signal into a digital signal; and a D/A converter 8030 for converting a digital signal into an audio output signal which is an analog signal. The handset 8010 comprises the following: a microphone 8011 for converting voice into an analog signal; and a speaker 8012 for converting an audio output signal which is an analog signal into voice.

A telephone conversation between the IP phone 8000*a* and the IP phone 8000*b* is performed in the following manner. Voice inputted from the microphone 8011 of the IP phone 8000*a* is converted into a digital signal by the A/D converter 8020 before the converted digital signal is inputted into the 2-channel communication device 800. The CPU 1 in the 2-channel communication device 800 converts the digital signal into a voice packet, and then transmits the voice packet as a transmit packet from the MAC unit 300*a* to the Ethernet 820*a*. The voice packet transmitted to the Ethernet 820*a* is forwarded to the IP phone 8000*b* on the other end via the HUB 8100*a* and the WAN. As soon as the IP phone 8000*b* on the other end receives the voice packet transmitted by the IP phone 8000*a*, the CPU 1 in the 2-channel communication device 800 converts the received voice packet into audio data, and then outputs the audio data to the D/A converter 8030. The audio data is converted into an audio signal, which is an analog signal, by the D/A converter 8030 before the audio signal is output from the speaker 8012 as voice. Communication processing from the IP phone 8000*b* to the IP phone 8000*a* is performed in like manner, and thereby a telephone conversation between the IP phone 8000*a* and the IP phone 8000*b* is realized.

Next, how a PC 830 which is connected through the IP phone 8000*a* reads a home page in the data center 8200 will be described below. When the PC 830 displays a home page using a Web browser, a packet having information about an URL of the home page to be displayed is transmitted to the Ethernet 820*b*. When the MAC unit 300*b* of the 2-channel communication device 800 receives this packet, the packet is transferred from the MAC unit 300*a* to the Ethernet 820*a* because a destination indicated by a MAC address of this packet is not the IP phone 8000. The transmitted packet passes through the HUB 8100, and arrives at the data center 8200 via the WAN. In the data center 8200, URL information is read from the packet transmitted by the PC 830; and information about a corresponding home page is converted into a packet before the packet is transmitted. After the packet transmitted by the data center 8200 arrives at the HUB 8100 via the WAN, the packet is received by the MAC unit 300*a* in the 2-channel communication device 800 through the Ethernet 820*a*. At this time the transfer judging circuit 200 in the 2-channel communication device 800 searches for a destination MAC address of the packet transmitted from the data center 8200. If the destination is judged to be the PC 830, this packet is transferred to the Ethernet 820*b*. As soon as the PC 830 receives the packet, the PC830 extracts the home page data from the received packet, and then displays the home page data on a Web browser. The processing described above enables communication between the IP phone 8000 and the PC 830.

Figure 13:
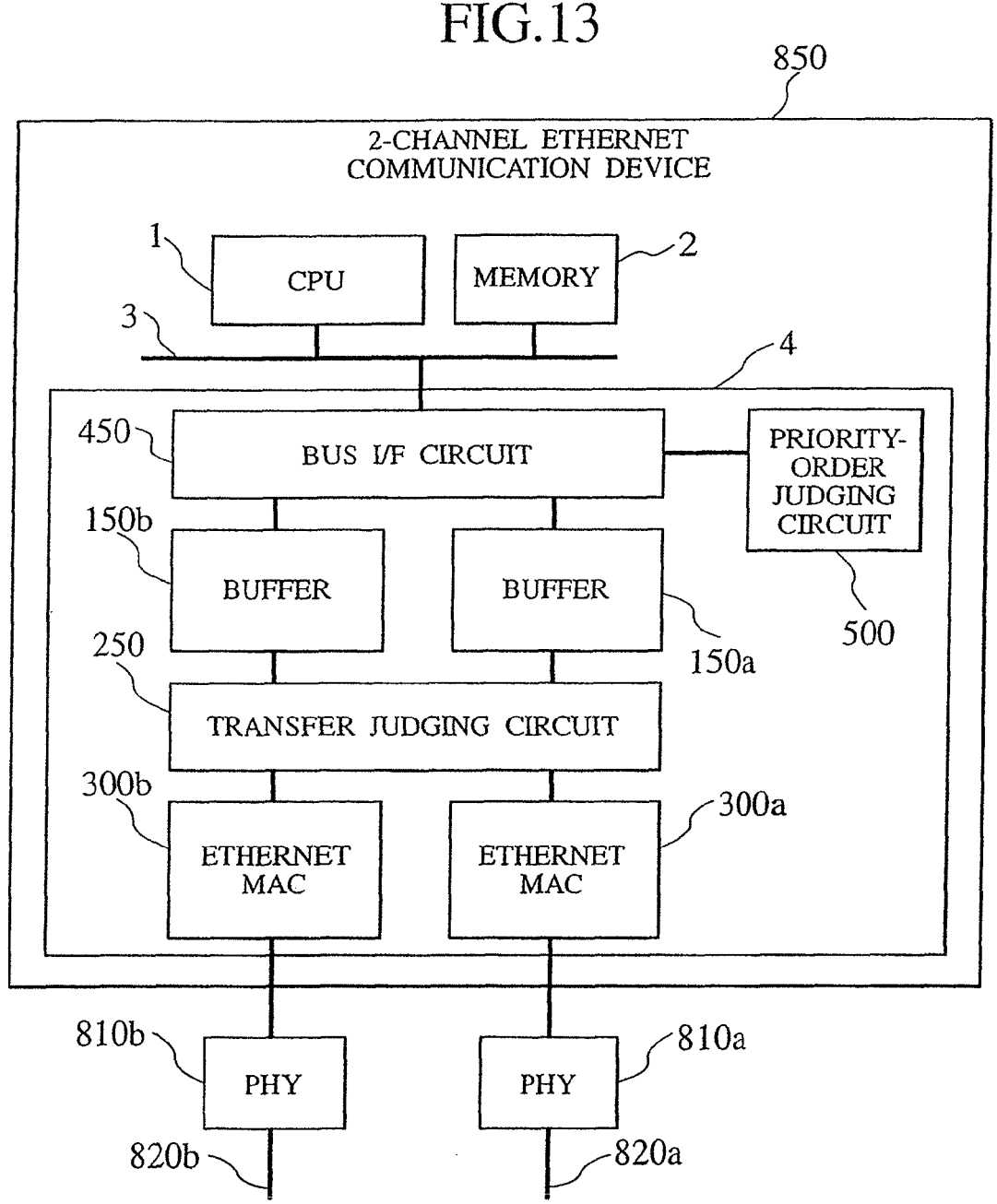
FIG. 13 is a block configuration diagram illustrating a 2-channel Ethernet communication device according to a second embodiment of the present invention.
Figure 18:
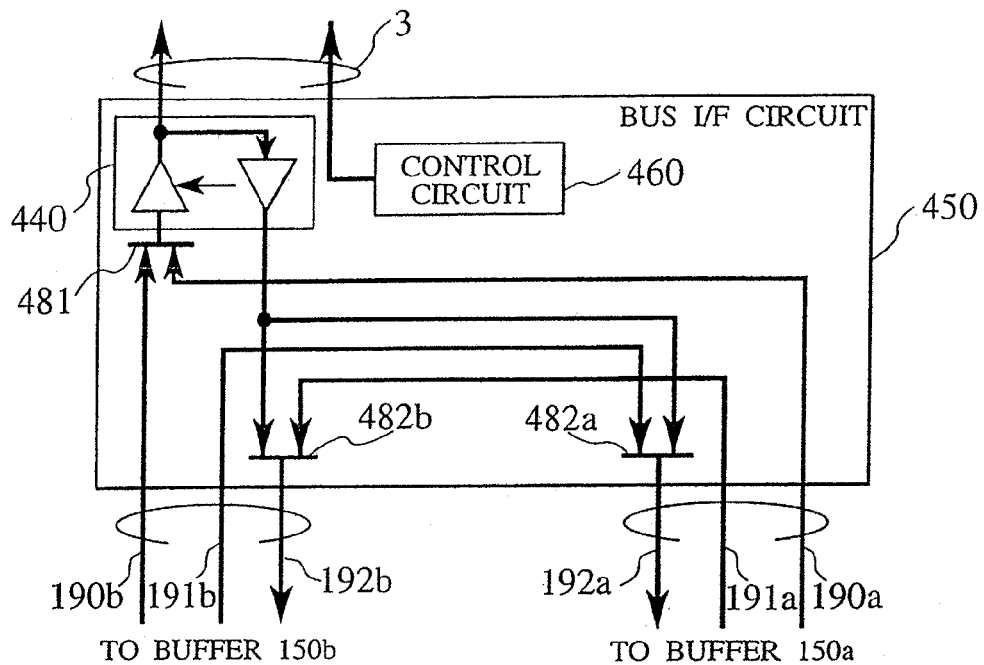
FIG. 18 is a block configuration diagram illustrating a bus I/F circuit.

Next, another embodiment of the present invention will be described with reference to FIG. 13. In this embodiment, as a substitute for the 2-channel Ethernet communication device 800 shown in FIG. 2, a 2-channel Ethernet communication device 850 is used as a packet communication device. In this embodiment, when processing a packet which is transmitted and received between the 2-channel Ethernet communication device 850 and the Ethernet communication device 830*a* (830*b*), considering that the extent to which real-time processing is required is different depending on the service to which the packet belongs, the priority order of a transmit packet is determined according to the service. To be more specific, the service can be distinguished by a combination of an IP address and a port that is an additional address. Therefore, in this embodiment, the priority order is assigned from the service that requires real-time processing to a great extent, according to the combination of an IP address and a port. The 2-channel communication device 850 satisfies the need for the real-time processing required by each service (QoS) by determining, according to this priority order, the order in which packets are transmitted and transferred.

The 2-channel Ethernet communication device 850 comprises the following: the CPU 1 as a packet generation processing means; the memory 2 for storing a program, and the like; and the 2-channel communication module 4. The components are connected to one another through the bus 3.

The 2-channel communication module 4 comprises the following: a bus I/F circuit 450 that transmits and receives data to/from the CPU 1 and the memory 2 through the bus 3; buffers 150a, 150b that hold transmit, receive, and transfer packets; the MAC units 300a, 300b that transmit and receive a packet; a transfer judging circuit 250 for determining which processing should be performed for the packet received by the MAC unit 300a (300b)-receive or transmit; a priority-order judging circuit 500 by which when the MAC unit 300a (300b) transmits a packet, the priority order of transmit and transfer packets held in the buffers 150a, 150b is determined judging from the combination of an IP address and a port.

When determining the priority order for the 2-channel Ethernet communication device 850, and the Ethernet communication devices 830a, 830b, for example, one communication device is used as a priority-order control unit to determine the priority order on a service basis in this priority-order control unit at any time according to the combination of an IP address and a port. Then, the priority order according to the determination is transmitted to each communication device.

As shown in FIG. 14, the buffer 150a (150b) comprises the following: a receiving FIFO buffer 160; a transferring FIFO buffer 165 that temporarily holds a packet to be transferred; transmitting FIFO buffers 170-1 through 170-N that hold transmission and transfer packets (the number of transmitting FIFO buffers is N); and a selector 180 for selecting an output of the transmitting FIFO buffers 170-1 through 170-N (the number of transmitting FIFO buffers is N). It is to be noted that the highest priority order is given to the transmitting FIFO buffer 170-1; and the lowest priority order is given to the transmitting FIFO buffer 170-N. Each of the buffers 150a, 150b is connected to the bus I/F circuit 450 through an output 190 of the receiving FIFO buffer 160, an output 191 of the transferring FIFO buffer 165, and an input 192 to the transmitting FIFO buffers 170-1 through 170-N. On the other hand, each of the buffers 150a, 150b is connected to the transfer judging circuit 250 through an input 195 to the receiving FIFO buffer 160, an input 196 to the transferring FIFO buffer 165, an output 197 of the selector 180 for selecting an output of the transmitting FIFO buffers 170-1 through 170-N, and a selection control signal 198 of the selector 180.

Here, receiving, transferring, and transmitting FIFO buffers in the buffers 150a, 150b are designated as receiving FIFO buffers 160a, 160b, transferring FIFO buffers 165a, 165b, and transmitting FIFO buffers 170-1 through 170-Na, 170-1 through 170-Nb respectively. In this case, the transmitting FIFO buffer is configured as a transmit buffer means that holds a packet in association with the priority order relating to the extent to which real-time processing is required.

As shown in FIG. 15, the priority-order judging circuit 500 comprises two CAMs 510a, 510b, and two registers 520a, 520b. Each of the CAMs 510a, 510b has entries as shown in FIG. 16. Each entry includes the following: information indicating a version of an IP address—IPv4 (version 4:32 bits) or IPv6 (version 6:128 bits); a combination of an IP address and a port; priority information indicating a transmitting FIFO buffer which is a destination of transfer, said transmitting FIFO buffer being selected from among the transmitting FIFO buffers 170-1 through 170-N in response to the combination; and a work area. It is so devised that instead of an address, the combination of an IP address and a port is used as an input, and then priority information of an entry having the same combination of an input IP address and a port as this input is output. In addition, the work area is used when the CPU 1 updates the entry. Moreover, if a plurality of entries having the same combination of an IP address and a port are found, information of the entry, an index number of which is smallest, is output. Further, the CPU 1 sets and updates entries of this priority judging circuit 500.

As shown in FIG. 17, each of the registers 520a, 520b comprises three registers R5201, R5202, R5203. The register R5201 is set by the CPU 1. This register holds an output value when a combination of an IP address and a port inquired by the bus I/P circuit 450 is not registered in the CAM 510. In this case, the IP address is held in the register R5202, and the port is held in the register R5203. Then, an update request for updating the CAM 510 is output to the CPU 1 as an interrupt.

The bus I/F circuit 450 comprises an input/output buffer 440, a control circuit 460, and selectors 481, 482a, 482b. The control circuit 460 monitors the transmission descriptors 21a, 21b in the memory 2, the transferring FIFO buffers 165a, 165b, and the receiving FIFO buffers 160a, 160b. If the control circuit 460 detects that a packet has been registered in the transmission descriptor 21a (21b) by the CPU 1, the packet in the transmission descriptor 21a (21b) is read through the bus 3 while keeping the input/output buffer 440 in an input state. After that, the control circuit 460 sends an inquiry to the CAM 510a (510b) about a transmitting FIFO buffer as a destination of transfer which is selected from among the transmitting FIFO buffers 170-1 through 170-Na (transmitting FIFO buffers 170-1 through 170-Nb) in the buffers 150a (150b) according to the combination of an IP address and a port of the read packet. Then, the control circuit 460 switches the selector 482a (482b) to the input/output buffer 440 side to transfer a packet which is output from the input/output buffer 440 to the transmitting FIFO buffer 170a (170b) determined by the CAM510a (Slob). In a similar manner, as soon as the control circuit 460 finds out by the transfer judging circuit 250 that a packet has been transmitted to the transferring FIFO buffer 165a (165b), the control circuit 460 sends an inquiry to the priority-order judging circuit 500 about whether or not transfer to the transmitting FIFO buffers 170-1 through 170-Na (transmitting FIFO buffers 170-1 through 170-Nb) is performed, which is determined by a combination of an IP address and a port of the packet. Then, the control circuit 460 switches the selector 482a (482b) to the transferring FIFO buffer 165b (160a) side to transfer the packet received from the transferring FIFO buffer 165b (165a) to the transferring FIFO buffer 170a (170b) determined by the CAM 510a (510b).

Moreover, as soon as the packet received by the MAC unit 300a (300b) is transferred to the receiving FIFO buffer 160a (160b) by the transfer judging circuit 250, the control circuit 460 instructs the selector 481 to select an output 190a (190b) of the receiving FIFO buffer 160a (160b) while keeping the input/output buffer 440 in an output state. Then, the control circuit 460 transmits the selected packet to the reception descriptor 22a (22b) in the memory 2 through the bus 3.

Figure 19:
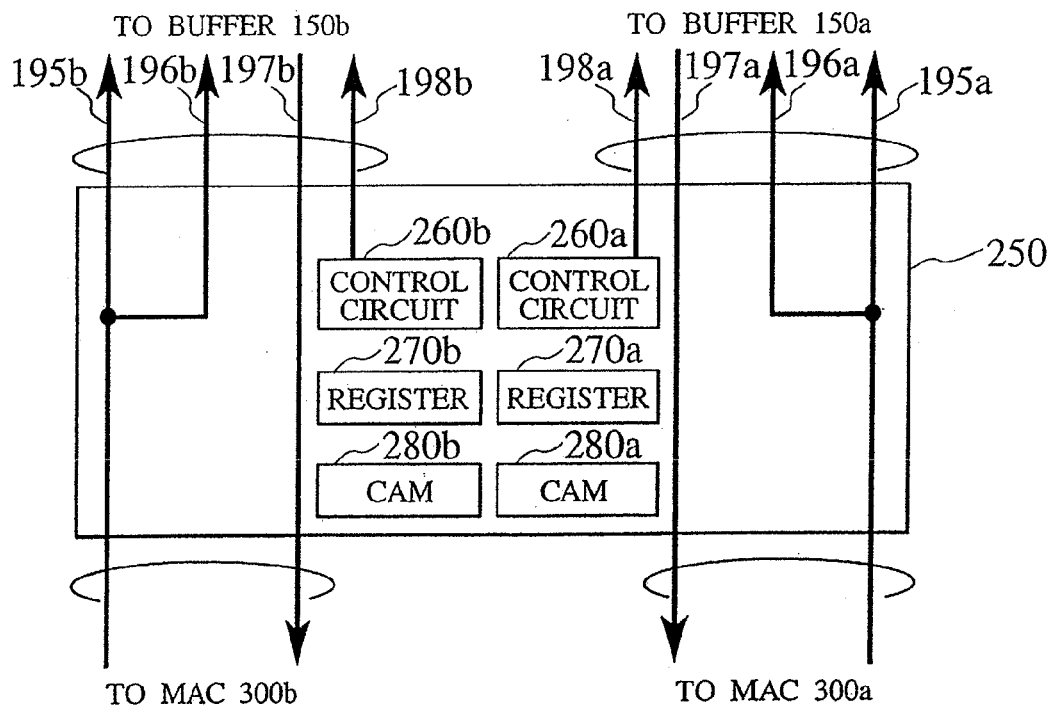
FIG. 19 is a block configuration diagram illustrating a transfer judging circuit.

On the other hand, as shown in FIG. 19, the transfer judging circuit 250 comprises control circuits 260a, 260b, registers 270a, 270b, and CAMs 280a, 280b. The control circuit 260a (260b) sends an inquiry to the CAM280a (280b) about the packet received by the MAC unit 300a (300b) to check a kind of processing to be performed—receive, transfer, receive & transfer, or discard. Additionally, the control circuit 260a (260b) also controls the selector 180 in the buffer 150a (150b). The CAM 280a (280b) is configured to hold information about how to process the packet which has been received by the MAC unit 300a (300b)—receive, transfer, receive & transfer, or discard.

Figures 20, 21:
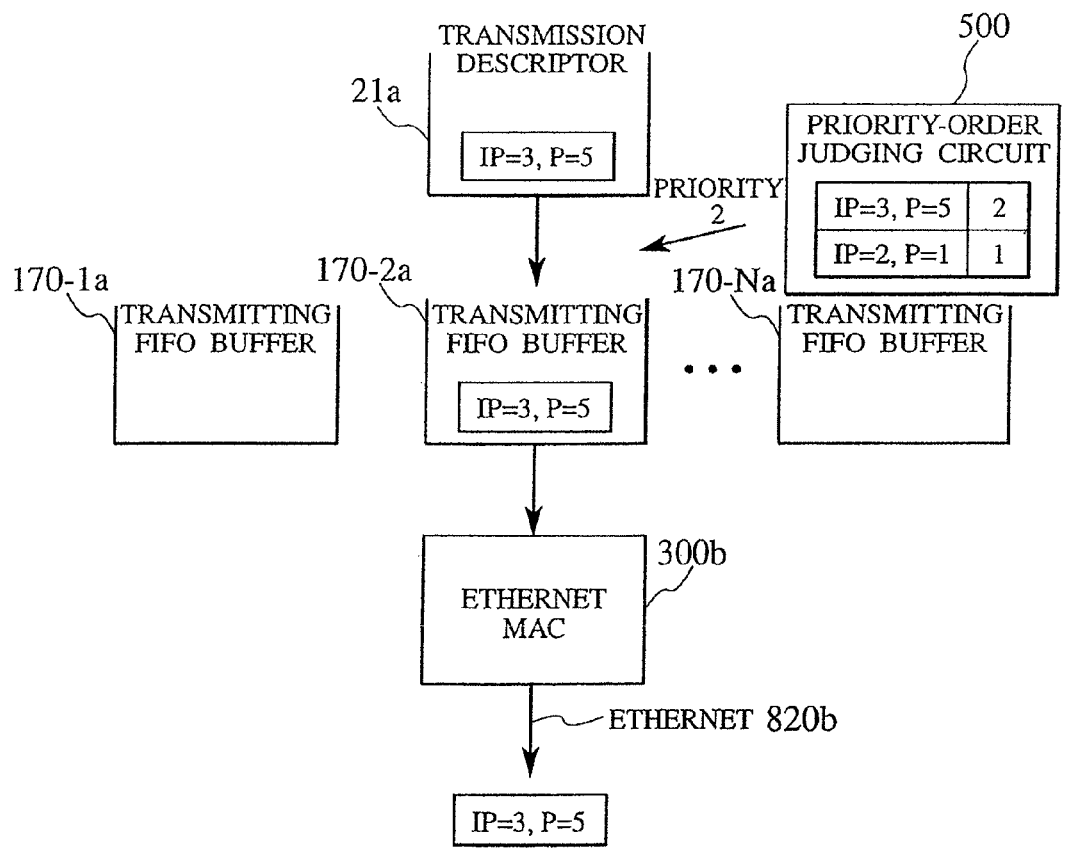
FIG. 20 is a configuration diagram illustrating registers.
FIG. 21 is a flowchart illustrating packet transmission processing.

To be more specific, as shown in FIG. 20, each of the registers 270a, 270b comprises three registers R2701, R2702, R2703. The register R2701 is provided with information about processing to be performed when a destination MAC address of the packet received by the MAC unit 300a (300b) is not registered in the CAM280a (280b) receive, transfer, receive & transfer, or discard. The register R2702 is provided with a common threshold value of a usage rate used for the transmitting FIFO buffers 170-1 through 170-Na (transmitting FIFO buffers 170-1 through 170-Nb) which perform the priority switching. The register R2703 is provided with a common threshold value of a usage rate used for the transmitting FIFO buffers 170-1 through 170-Na (transmitting FIFO buffers 170-1 through 170-Nb) which invoke the flow control. The threshold value is selectable from 0 to 100%. If 0% is specified, this threshold value setting is disabled.

Each of the control circuit 260a, 260b monitors usage rates of the transmitting FIFO buffers 170-1 through 170-N, the number of which is N. If the usage rate of the transmitting FIFO buffers 170-1 through 170-N is smaller than or equal to a threshold value held in the register 2702, a control signal 198 used to select an output of the transmitting FIFO buffer 170 which holds a packet having the highest priority is output to the selector 180. On the other hand, if the usage rate of the transmitting FIFO buffer 170 exceeds a threshold value which is set in the register R2702, the selection signal 198 used to select an output of the transmitting FIFO buffer 170, which exceeds a threshold value, is output to the selector 180.

Moreover, in a similar manner, even if only one of usage rates of the transmitting FIFO buffers 170-1 through 170-Na (transmitting FIFO buffers 170-1 through 170-Nb) exceeds a threshold value (threshold value for flow control) held in the register R2703, a flow-control packet is output to the Ethernet 820a (820b) through the MAC unit 300a (300b).

As a result, at ordinary times, packets held in the transmitting FIFO buffers 170-1 through 170-N are transmitted to the MAC units 300a, 300b, and overflow of the transmitting FIFO buffer 170 can be prevented.

In addition, an inquiry about a destination MAC address of a packet received by, the MAC unit 300a (300b) is sent to the CAMP 280a (280b) to check processing to be performed—receive, transfer, receive & transfer, or discard. If receive is performed, the packet is transferred to the receiving FIFO buffer 160a (160b). If transfer is performed, the packet is transferred to the transferring FIFO buffer 165a (165b). If receive & transfer are performed, the packet is transferred to both of the receiving FIFO buffer 160a (160b) and the transferring FIFO buffer 165a (165b). On the other hand, if discard is performed, the packet is not transferred to the receiving FIFO buffer 160a (160b) and the transferring FIFO buffer 165a (165b).

Next, operation of the 2-channel communication device 800 will be described. In the first place, as shown in FIG. 21, when transmitting a packet, transmission processing is performed as follows. The 2-channel communication module 4 monitors the transmission descriptor 21a (21b) in the memory 2. As soon as the CPU 1 writes a packet into the transmission descriptor 21a (21b), the bus I/F circuit 450 reads the transmit packet from the transmission descriptor 21a (21b). Then, the bus I/F circuit 450 sends an inquiry to the priority-order judging circuit 500 about the priority order of the packet on the basis of a combination of an IP address and a port of this packet, and thereby transfers the packet to the transmitting FIFO buffer 170a (170b) corresponding to the priority order. Next, the transfer judging circuit 250 transfers a packet having the highest priority from the transmitting FIFO buffers 170-1 through 170-Na (transmitting FIFO buffers 170-1 through 170-Nb) to the MAC unit 300a (300b), and transmits this packet to the Ethernet 820a or the Ethernet 820b. In an example shown in FIG. 21, if an IF address of the transmit packet is 3 and its port is 5, the priority order is 2. Therefore, the packet is transferred to the transmitting FIFO buffer 170-2a. In addition, because the transmitting FIFO buffer 170-1a is empty, this packet has the highest priority. Accordingly, this packet is transmitted to the Ethernet 820a.

Figure 22:
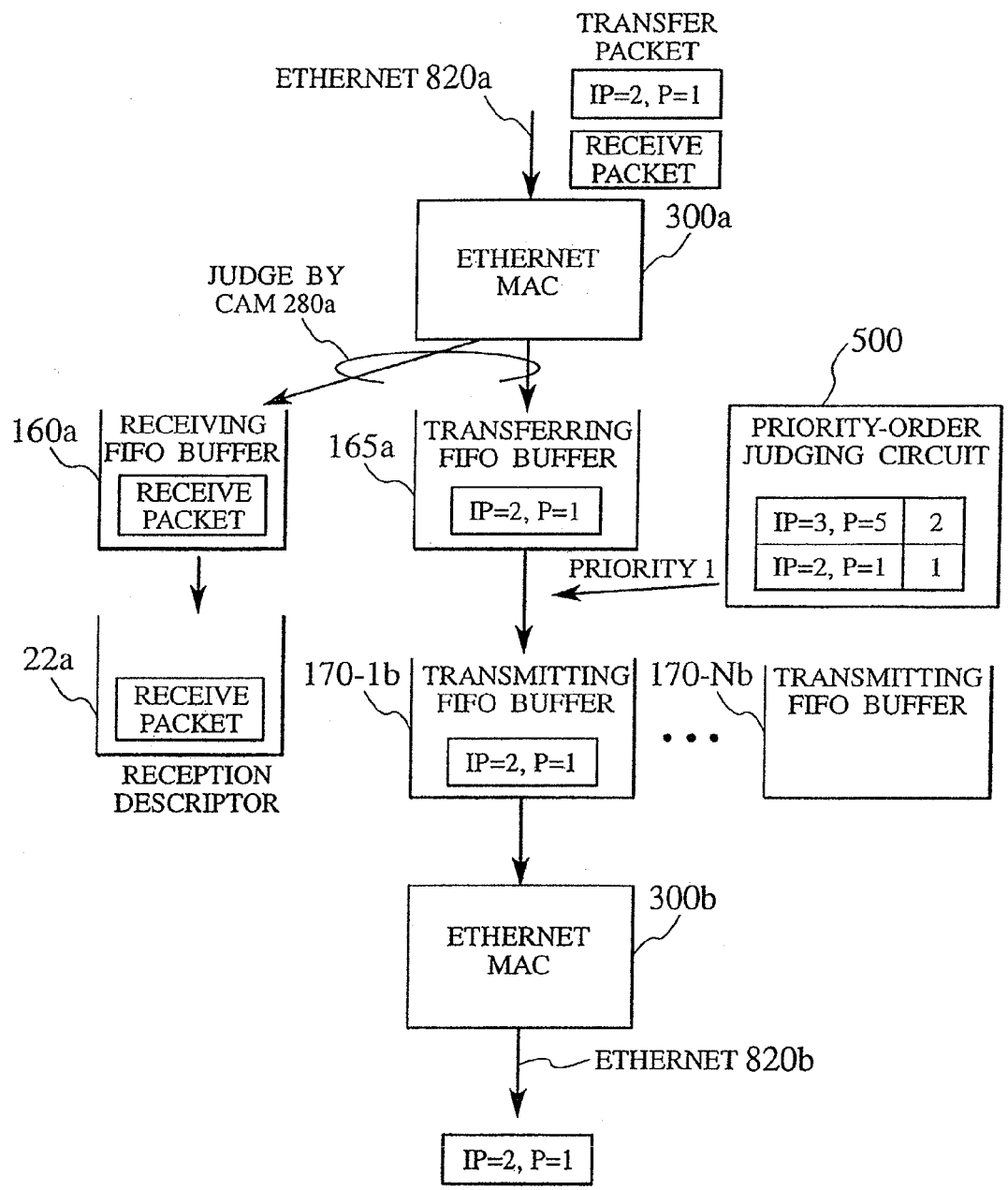
FIG. 22 is a flowchart illustrating packet receive and transfer processing.

Next, as shown in FIG. 22, if a packet is received and transferred, as soon as the MAC unit 300a (300b) receives a packet, the transfer judging circuit 250 checks a destination MAC address of the packet, and judges the packet to be a packet which should be received or a packet which should be transferred. If the transfer judging circuit 250 judges the packet to be a packet which should be received, this packet is written into the receiving FIFO buffer 160a (160b). In response to this, the Bus I/F circuit 450 reads the packet from the receiving FIFO buffer 160a (160b), and then writes this packet into the reception descriptor 22a (22b) in the memory 2 through the bus 3.

On the other hand, if the packet is transferred, the transfer judging circuit 250 writes the packet received by the MAC unit 300a (300b) into the transferring FIFO buffer 165a (165b). In response to this, the bus I/F circuit 450 reads a packet from the transferring FIFO buffer 165a (165b). Then, the bus I/F circuit 450 sends an inquiry to the priority-order judging circuit 500 about the priority order of the packet on the basis of a combination of an IP address and a port of the packet, and thereby transfers the packet to the transmitting FIFO buffer 170b (170a) corresponding to the priority order. Next, the transfer judging circuit 250 transfers a packet having the highest priority from the transmitting FIFO buffers 170-1 through 170-Mb (transmitting FIFO buffers 170-1 through 170-Na) to the MAC unit 300b (300a), and transmits this packet to the Ethernet 820b (820a). In an example shown in FIG. 22, an IP address of the transfer packet is 2, its port is 1, and its priority order is 1. Accordingly, after the transfer packet received by the MAC unit 300a is transferred to the transferring FIFO buffer 165a, the bus I/F circuit 450 transfers the transfer packet to the transmitting FIFO buffer 170-1b. Then, the packet is output from the MAC300b to the Ethernet 820b.

As a result, a packet having a higher priority is transmitted and transferred. Because a packet relating to the service that requires real-time processing is transmitted on a priority basis, it is possible to realize QoS.

Additionally, in this method, the CPU 1 registers the priority order in the priority judging circuit 500. Therefore, settings of the priority order can be automatically performed in real time. This eliminates the need for user's settings such as assignment of the priority order, which are difficult for a user.

In addition, if the number of packets received by the MAC unit 300a (300b) exceeds the number of packets which can be received and transferred by the 2-channel communication device 800, the flow control is invoked so that a device which transmits the packet is instructed to stop the packet transmission temporarily. This prevents the number of packets to be processed from exceeding the number of packets which can be received. As a result, it is possible to prevent the packet from being discarded. In this connection, if a packet is discarded because the flow control is not used, a packet which requests retransmission of the discarded packet is output to the Ethernet 820a (820b). This means that an unnecessary packet is transmitted on the Ethernet 820a (820b), causing a decrease in efficiency of the Ethernet 820a (820b).

On the other hand, the transfer judging circuit 250 performs arbitration processing that selects a packet from among packets in the transmitting FIFO buffers 170-1 through 170-N, the number of which is N, to transmit the selected packet to the MAC unit 300*a* (300*b*). Usually, a packet having a higher priority is transmitted on a priority basis. However, if packets are concentrated at a specific transmitting FIFO buffer, causing a packet having a lower priority to be delayed, the flow control is invoked, and the transmitting FIFO buffer overflows. As a result, efficiency in communication of the Ethernet 820*a* (820*b*) is decreased.

For this reason, the transfer judging circuit 250 always monitors usage rates of the transmitting FIFO buffers 170-1 through 170-N. If the usage rate of the transferring FIFO buffer 130 exceeds a predetermined threshold value (threshold value for changing the priority order), a packet in the transmitting FIFO buffer 170, a threshold value of which is exceeded, is transmitted on a priority basis. This prevents efficiency in communication of the Ethernet 820*a*, 820*b* from decreasing. To be more specific, the transfer judging circuit 250 and the bus I/F circuit 450 are configured as a prioritized-packet selecting means that selects a packet having the highest priority order from among transmit packets held in the buffer 150*a*, 150*b* according to the result of judgment by the priority judging circuit 500, and that outputs the packet, on a priority basis, to a specified communication means (MAC unit 300*a* (300*b*)) which supports a communication target (Ethernet 820*a* (820*b*)) to which the packet is transmitted or transferred.

Moreover, the transfer judging circuit 250 is also configured as a transfer control means that judges a packet received by the MAC unit 300*a* (300*b*) to be a packet which should be processed by the CPU 1 or a packet to be transferred, and that outputs the received packet to the transmitting FIFO buffers 170-1 through 170-N through the receiving FIFO buffer 160*a* (160*b*), and through the memory 2 or the transferring FIFO buffer 165*a* (165*b*) according to the result of the judgment. The bus I/F circuit 450 is also configured as a transfer control means that outputs the packet processed by the CPU 1 to the transmitting FIFO buffers 170-1 through 170-N as a transmit buffer means.

It is to be noted that the MAC unit 300*a* (300*b*) is configured as a communication means for transmitting and receiving a packet which includes an IP address and a port.

In the above-mentioned embodiment, for the purpose of arbitrating between packet transmission from the CPU 1 and packet transmission between two Ethernet 820*a*, 820*b*, a threshold value is given to a usage rate of the transfer buffer. In this case, if the usage rate of the buffer exceeds the threshold value, the priority order of the transfer buffer is increased. This prevents the flow control from being invoked, and also prevents the transfer buffer from overflowing. Therefore, it is possible to improve efficiency in communication of Ethernet.

In addition, it is so devised that the priority order is set according to a combination of an IP address and a port, and a packet is transmitted and transferred according to this priority order. Therefore, QoS can be realized. Moreover, a threshold value is given to a usage rate of the transmit buffer that holds transmit and transfer packets on a priority order basis. If the usage rate of the buffer exceeds the threshold value, increasing the priority order of the transmit buffer which has exceeded the threshold value prevents the flow control from being invoked, and prevents the transmit buffer from overflowing. Accordingly, it is possible to improve efficiency in communication of Ethernet.

It is to be noted that the packet communication device according to the present invention can be applied not only to the IP phone but also to an IP videophone.

As described above, according to the present invention, when transmitting a transmit packet in preference to transfer of a transfer packet, if a usage rate of the transfer buffer means exceeds a threshold value, the priority of the transfer packet is made higher than that of the transmit packet. As a result, the transfer packet is output to the specified communication means in preference to the transmit packet. Therefore, it is possible to prevent the transfer buffer means from overflowing.

Furthermore, according to the present invention, when transmitting and receiving a packet that includes an IP address and a port which is an additional address, the priority order of a packet to be transmitted and received is determined on the basis of a combination of an IP address and a port, according to the need for real-time processing presented by the packet. Therefore, a packet can be transmitted and received in response to contents of service which change every moment, which ensures successful real-time processing.

Figure 23:
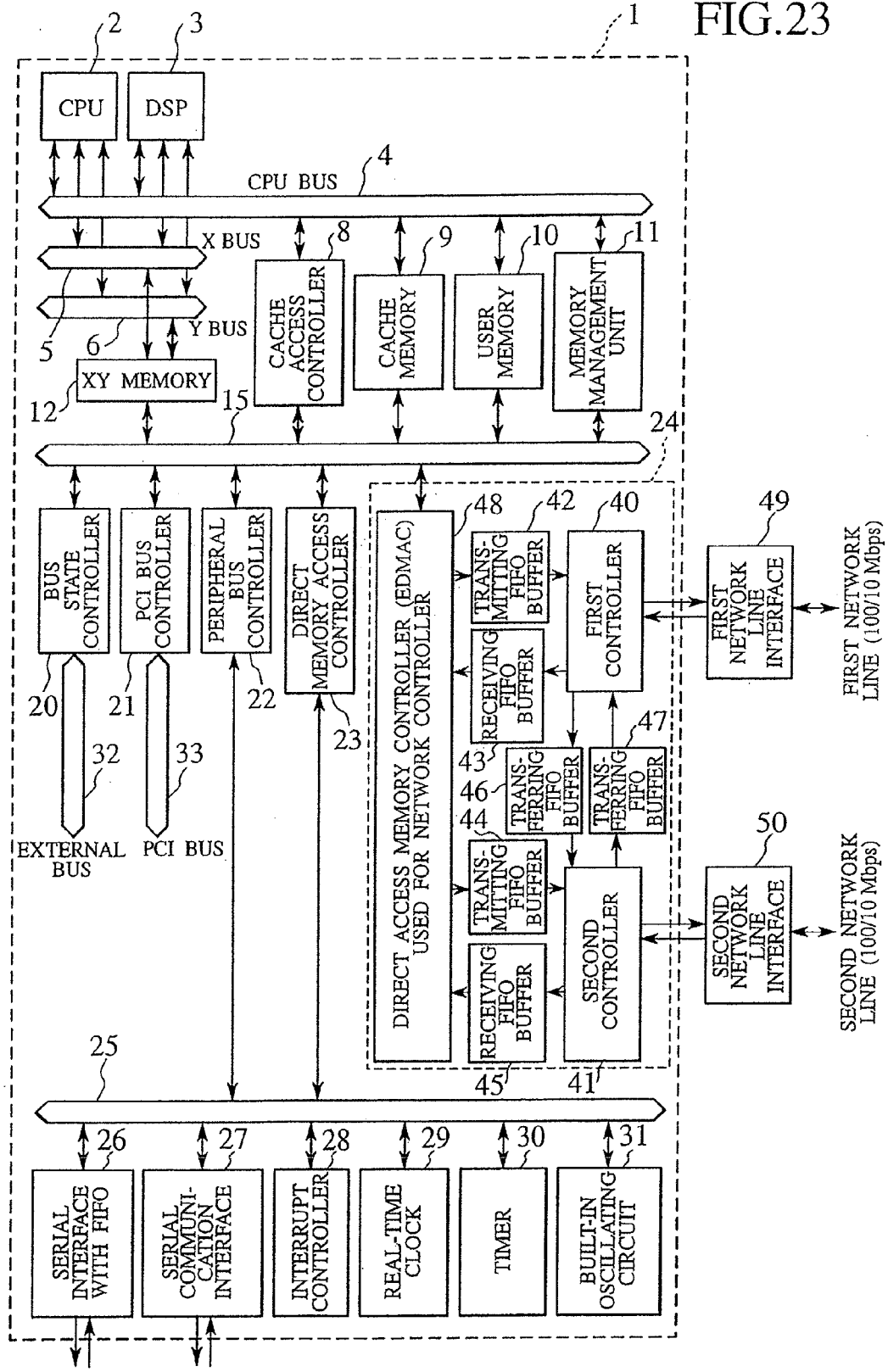
FIG. 23 is a block diagram illustrating a data processor according to the present invention.

FIG. 23 illustrates an example of a data processor according to the present invention. Although there is no limitation on the data processor illustrated in the figure in particular, it is formed on one semiconductor substrate (chip) such as single crystal silicon by the CMOS integrated-circuit production technology.

A data processor 2001 comprises a CPU (Central Processing Unit) 2002 as a central processing unit, and a DSP (Digital signal Processor) 2003 as a digital signal unit. They are connected to a CPU bus 2004, a X bus 2005, and a Y bus 2006. To the CPU bus 2004, a cache access controller 2008, a cache memory 2009, a user memory 2010 which is constituted of SRAMs for example, and a memory management unit 2011 are connected. A XY memory 2012 is connected to the X bus 2005 and the Y bus 2006. The XY memory 2012 is used to store a program executed by the CPU 2002 and the DSP 2003, or a command and required operation target data.

The cache access controller 2008, the cache memory 2009, the user memory 2010, the memory management unit 2011, and the XY memory 2012 are each Connected to an internal bus 2015. To this internal bus 2015, a bus state controller 2020 used for external-bus access control, a PCI bus controller 2021, a peripheral bus controller 2022, a direct memory access controller 2023, and a network control unit 2024 are also connected. Through a peripheral bus 2025, the peripheral bus controller 2022 performs access control of the following: a serial interface with FIFO 2026; a serial communication interface 2027; an interrupt controller 2028; a real-time clock 2029; a timer 2030; and a built-in oscillating circuit 2031. To an external bus 2032 which is connected to the bus state controller 2020, and to a PCI bus 2033 which is connected to the PCI bus controller 2021, a nonvolatile memory such as a flash memory, and a large-capacity memory such as a synchronous DRAM, are connected. Illustration of those memories in the figure is omitted here.

The network control unit 2024 is in conformity with the Ethernet (registered trademark) protocol for example. The network control unit 2024 comprises a first network controller (this is also designated as a first controller) 2040 as a first data communication channel, and a second network controller (this is also designated as a second controller) 2041 as a second data communication channel. The first network controller and the second network controller can be connected to an independent network line (this is also designated as a line) through network line interfaces (they are also designated as line interfaces) 2049, 2050 respectively. The communication speeds of a network line include two kinds of speeds, 10 Mbps and 100 Mbps. When considering speeds of two network controllers 2040, 2041, any combination of the speeds can be freely used. For example, the first network controller 2040 uses 10 Mbps (or 100 Mbps), and the second network controller 2041 uses 100 Mbps (or 10 Mbps); or both of the network controllers 2040, 2041 use 10 Mbps (or 100 Mbps).

Transmitting and receiving FIFO buffers which temporarily store transmitted and received data are connected to the two network controllers 2040, 2041. A transmitting FIFO buffer 2042 and a receiving FIFO buffer 2043 are connected to the first network controller 2040; and a transmitting FIFO buffer 2044 and a receiving FIFO buffer 2045 are connected to the second network controller 2041. A direct access memory controller (EDMAC) used for the network controller is placed in such a manner that the FIFO buffers 2042 through 2045 are connected to the internal bus 2015 through this direct access memory controller. The direct access memory controller enables DMA transfer of transmit data and received data.

Between the two network controllers 2040, 2041, as transferring FIFO buffers which temporarily store data transferred between them, a transferring FIFO buffer 2046 which transfers data from the first network controller 2046 to the second network controller 47 and a transferring FIFO buffer 2047 which transfers data in the reverse direction are placed. Operation of the transferring FIFO buffers is controlled so as to obviate underflow and overflow which are caused by a difference in state of communication and a difference in communication speed. The operation control is roughly classified into the following categories: (1) distribution control that distributes received information into a transmitting and receiving FIFO buffer and a transferring FIFO buffer according to an address included in the information which has been received from outside; (2) variable setting control of a storage capacity of a transferring FIFO buffer; (3) control that recognizes line speed at the time of 100 Mbps connection and 10 Mbps connection to assign as many transfer buffers as possible to the high speed (100 Mbps) side; (4) alarm output control that notifies of a lack of buffer capacity of a transferring FIFO buffer; and (5) dynamic variable control that dynamically makes buffer capacity variable in response to a state of communication (degree of communication congestion).

When receiving a frame from the first network line, as for the received frame which has passed through the first network line interface 2049, if destination address information (MAC (Media Access Control) address) in the frame in the first network controller 2040 is coincident with its own information, the first network controller 2040 outputs the data to the receiving FIFO buffer 2043 which is directly connected to the first network controller 2040. On the other hand, if the destination address information is not coincident, the data is not output to the receiving FIFO buffer 2043. If the second network controller 2041 is connected to the network line, the data is output to the transferring FIFO buffer 2046. Even in the receiving operation of the second network line interface 2050, a function similar to the above-mentioned function is realized. When a network line for exclusively transmitting data such as audio data, which requires real-time processing, is connected to one network controller 2040, and when a network line which transmits at a time a large quantity of data such as file data is connected to the other side, this distribution control can prevent the data transmission from disturbing each other. In this case, if data transmission is performed between both of the networks, features of which are different from each other, data can be directly transmitted from one network to another network without performing processing on the CPU 2002 side. Therefore, it is possible to avoid a situation in which as is usual with the conventional method, data transmission between networks are delayed, causing system performance to be decreased.

The speed of the network line, that is to say, transfer rates of the first network line and the second network line (10 Mbps/100 Mbps), can be judged by receiving communication speed information from the network controllers 2040, 2041 or a general-purpose I/O port of the data processor 1 through the network line interfaces 2049, 2050. The receiving timing is considered to be after reset processing executed when the data processor 1 is powered on, or when a line is opened, for example, when a network cable is connected.

Figure 24:
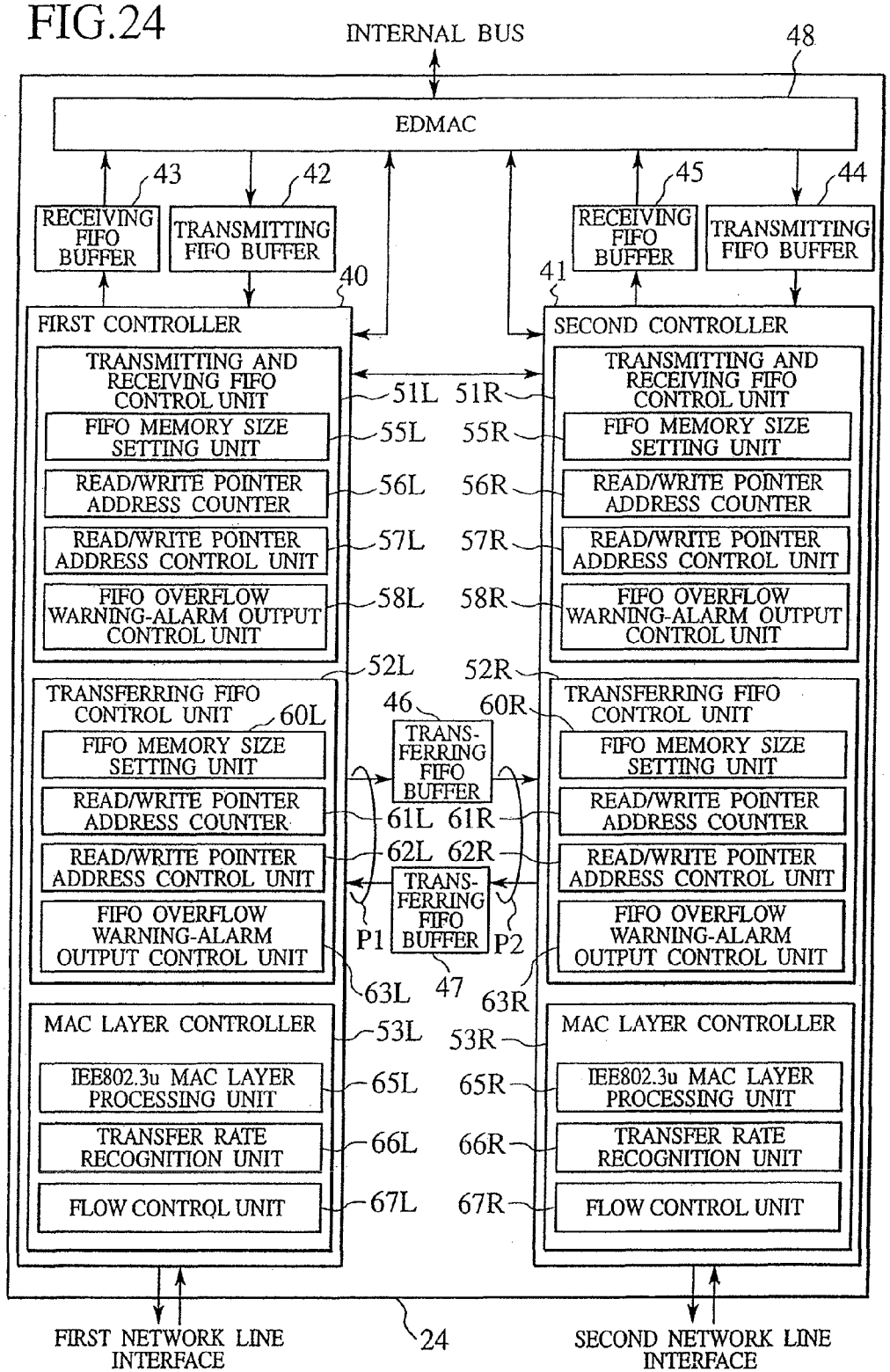
FIG. 24 is a block diagram illustrating a network control unit in detail.

FIG. 24 illustrates details of the network control unit 2024 as an example. The first network controller 2040 (2041) comprises a transmitting and receiving FIFO control unit 2051L (2051R), a transferring FIFO control unit 2052L (2052R), and a MAC layer controller 2053L (2053R). Each of the transferring FIFO buffers 2046, 2047 is constituted of one dual port RAM for example. P1 means its first access port; and P2 means its second access port.

The transmitting and receiving FIFO control unit 2051L (2051R) comprises the following: a FIFO memory size setting unit 2055L (2055R) for the transmitting FIFO buffer 2042 (2044) and the receiving FIFO buffer 2043 (2045); a read/write pointer address counter 2056L (2056R); a read/write pointer address control unit 2057L (2057R); and an overflow warning-alarm output control unit 2058L (2058R). The FIFO memory size setting unit 2055L has a size register for specifying a memory size of the receiving FIFO buffer 2043. The FIFO memory size setting unit 2055R has a size register for specifying a memory size of the receiving FIFO buffer 2045. Initial settings for the size register is performed by the CPU 2002, for example. A read pointer address counter of the read/write pointer address counter 2056L (2056R) is used for the transmitting and receiving FIFO buffer 2042 (2044); and a write pointer address counter is used for the transmitting and receiving FIFO buffer 2043 (2045).

The transferring FIFO control unit 2052L (2052R) comprises the following: a FIFO memory size setting unit 2060L (2060R) for the transferring FIFO buffers 2046, 2047; a read/write pointer address counter 2061L (2061R); a read/write pointer address control unit 2062L (2062R); and an overflow warning-alarm output control unit 2063L (2063R). The FIFO memory size setting unit 2060L has a size register for specifying a memory size of the transferring FIFO buffer 2046. The FIFO memory size setting unit 2060R has a size register for specifying a memory size of the transferring FIFO buffer 2047. Initial settings for the size register is performed by the CPU 2002. A read pointer address counter of the read/write pointer address counter 2061L (2061R) is used for the transferring FIFO buffer 2047 (2046); and a write pointer address counter is used for the transferring FIFO buffer 2046 (2047). The read/write pointer address control unit 2062L (2062R) performs the following: control of an address count value according to sizes of the transferring FIFO buffers 2045, 2047; address management which is used for dynamic variable control of the transferring FIFO buffer during communication operation; and the like. Additionally, the read/write pointer address control unit 2062L (2062R) has an enable bit that indicates whether or not the dynamic variable control is performed. The enable bit is set by the GPU 2 according to program control, for example. The overflow warning-alarm output control unit 2063L (2063R) outputs an alarm signal when the quantity accumulated in the transferring FIFO buffer 2046 or 2047 reaches an overflow warning level. This alarm is used as information for making a decision to change the memory capacity during the dynamic variable control of the transferring FIFO buffers 2046, 2047.

The MAC layer controller 2053L (2053R) comprises a MAC layer processing unit 2065L (2065R), a transfer rate recognition unit 2066L (2066R), and a flow control unit 2067L (2067R). The MAC layer processing unit 2065L (2065R) recognizes a packet and a MAC address which are included in received information. The transfer rate recognition unit 2066L (2066R) recognizes the line speed—10 Mbps or 100 Mbps. The flow control unit 2067L (2067R) performs the flow control by transmitting a pause frame, etc. into a line so that overflowing with received data is not caused.

Figure 25:
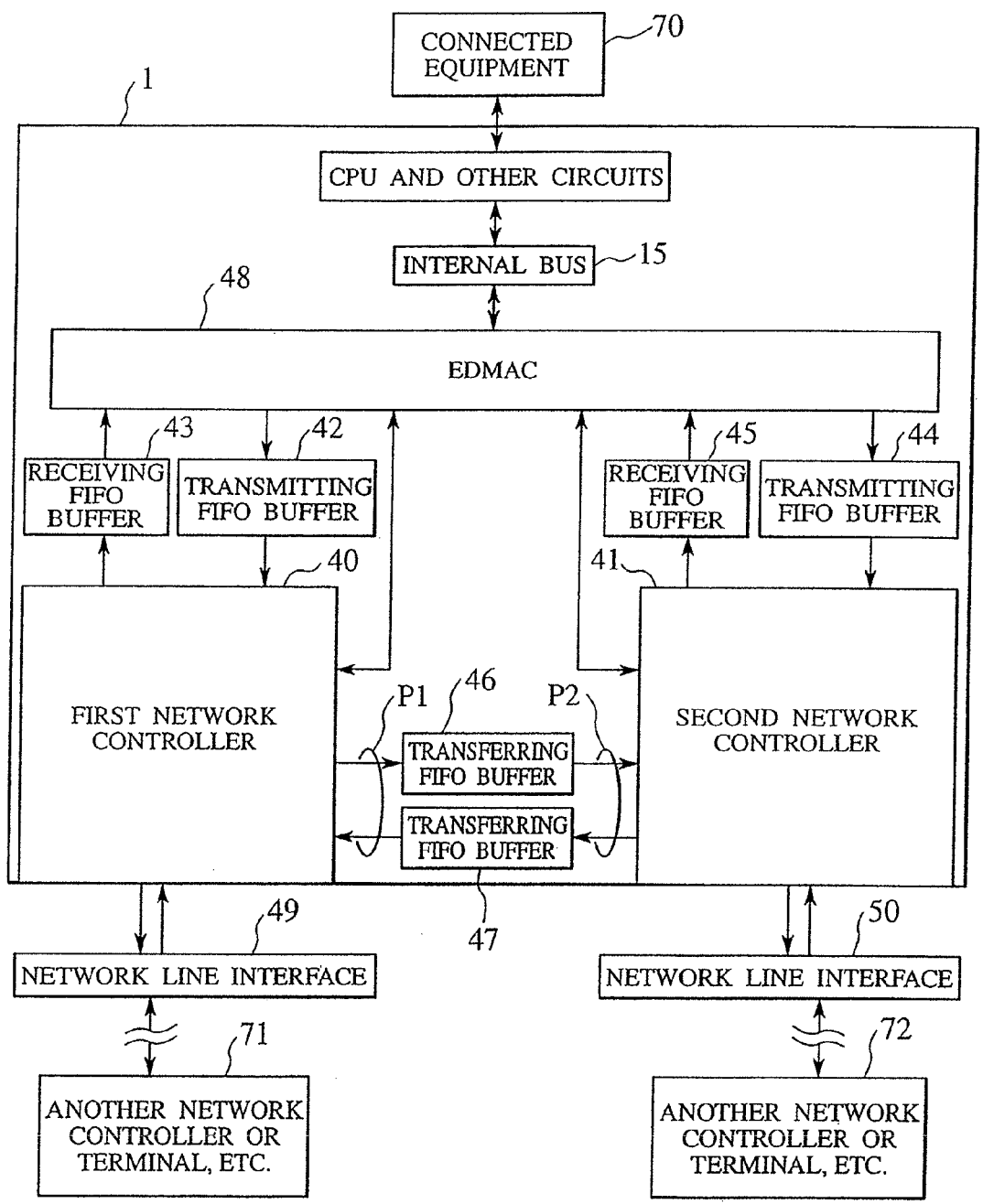
FIG. 25 is a block diagram illustrating a data transfer system which uses a data processor.

FIG. 25 illustrates an example of a system configuration which uses the data processor 1. Connected equipment 2070 is connected to an interface circuit (for example, the bus state controller 2020, the PCI bus controller 2021, or the serial communication interface 2027) in the data processor 2001. There is no limitation on the connected equipment 2070 in particular. However, a dumb terminal (console), a visual display terminal for displaying a moving image or a still image, a telephone, a file transfer device, a modem, a personal computer, etc. are connected to the connected equipment 2070. The connected equipment may also be disconnected. Information from the connected equipment 70 may also be output to a network line via network controllers 40, 41.

In FIG. 25, to network lines connected to the network line interfaces 2049, 2050, another network controller such as a hub and a router, terminal equipment including a network controller, or the like, is connected. For example, a PC (Personal Computer) 2071, an IP (Internet Protocol) telephone 2072, or the like, is connected.

Figure 26:
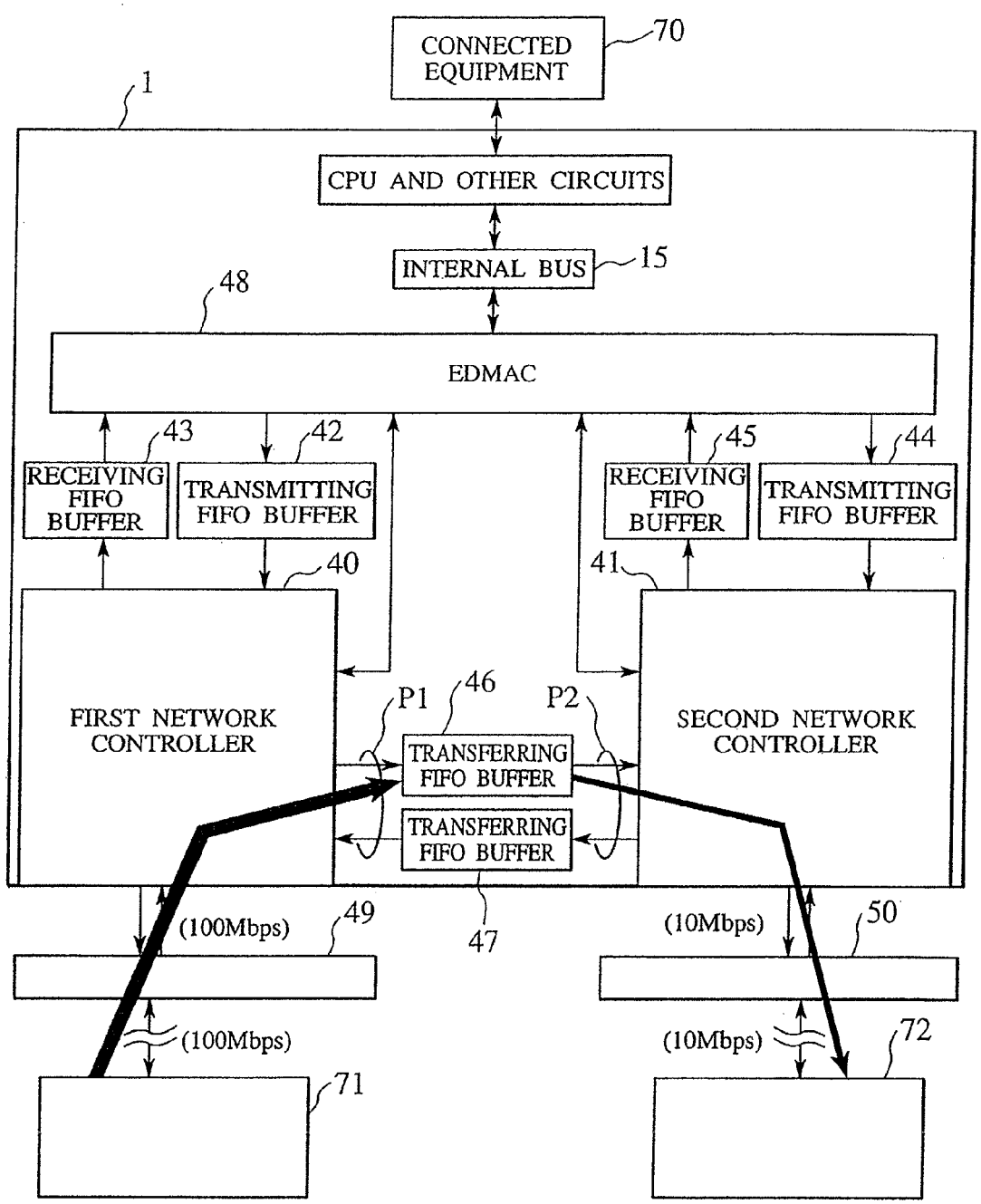
FIG. 26 is an explanatory diagram illustrating a state observed when data transfer is performed between network lines, communication speeds of which are different from each other, in the system shown in FIG. 25.

FIG. 26 illustrates a state observed when data transfer is performed between network lines, communication speeds of which are different from each other, in the system shown in FIG. 25. The first network controller 2040 side operates at a speed of 100 Mbps; and the second network controller 2041 side operates at a speed of 10 Mbps. In this manner, communication data is transferred between the controllers, communication speeds of which are different from each other.

When transmitting data such as a file from the 100 Mbps side to the 10 Mbps side (for example, when continuously transmitting data equivalent to 1000 bytes×10 frames in succession), while the 10 Mbps side receives one frame, the 100 Mbps side has transmitted 10 frames completely. In such a case, when considering retransmission of one frame as a result, a buffer which can store 10 frames (1000 bytes×10=10 kilobytes) is required. Accordingly, if the capacity of the transferring FIFO buffer 2046 equivalent to 10 kilobytes cannot be reserved, the FIFO buffer overflows, causing the overflowed data to be discarded. Therefore, the data transfer does not end.

A first method for coping with this is such that a window size is reduced to about 2 kilobytes. To be more specific, every time data specified by this window size is transmitted, the transmission side waits for an acknowledgment frame (ACK frame) from the receiving side; and the transmission side cannot transmit a large file in succession without receiving an acknowledgment frame. In this method, if the window size is reduced, the transmission side waits for a receiving acknowledgment frame from the receiving side every time 2-kilobyte data is received, which causes communication overhead to become larger. As a result, the efficiency in transfer is lowered. A second method is to increase the capacity of the transferring FIFO buffer 2046 sufficiently. More specifically, for storage-capacity variable control of the transferring FIFO buffer area, a size loaded into a size register of the FIFO memory size setting unit 20601, of the network controller 2040 using program control of the CPU is made larger than a size loaded into a size register of the FIFO memory size setting unit 2060R of the network controller 2041. In brief, a size of the transferring FIFO buffer, into which the network controller connecting to a network having a high-speed transfer rate writes data, is made larger. Because there is a physical limitation on the storage capacity of the transferring FIFO buffers 2046, 2047, the second method may also be effective if the first method is used in combination. Moreover, even if both of the methods are used in combination, the methods may also be insufficient for a temporary concentration of transfer traffic. Dynamic variable control of the storage capacity of a buffer area can be effectively used to cope with this. Details an the dynamic variable control will be described later.

Figure 27:
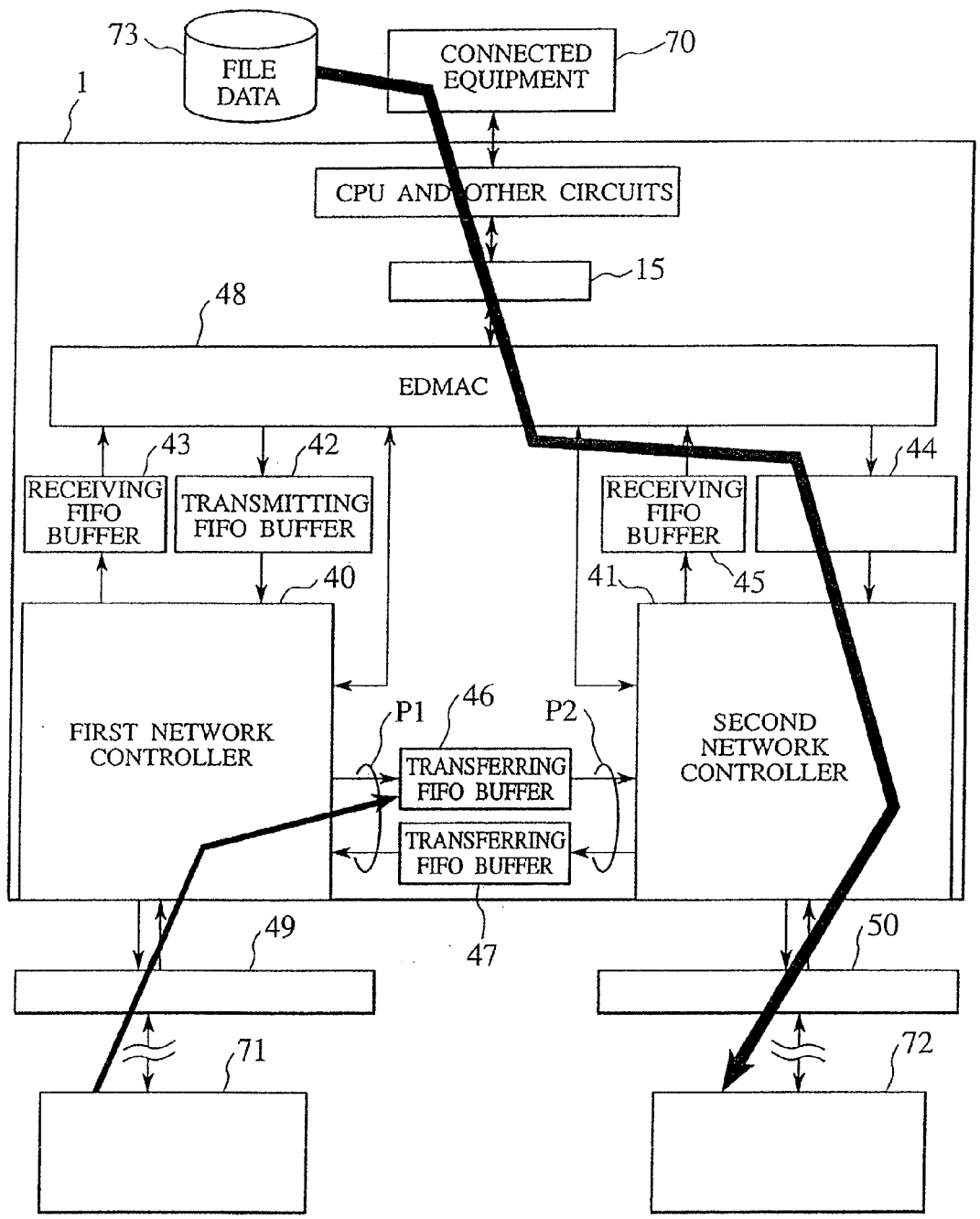
FIG. 27 is an explanatory diagram illustrating a state observed when file data is transmitted from connected equipment to another communication controller in the system shown in FIG. 25.

FIG. 27 illustrates a state observed when file data is transmitted from the connected equipment 2070 to another communication controller in the system shown in FIG. 25. Here, a case where file data is transferred from a file device 2073 connected to the connected equipment 2070 to another communication controller 2072 via the second network controller 2041 will be described.

While transferring the file data, the second network controller 2041 is intermittently used. However, the second network controller 2041 can be used for transmission of communication data from the first network controller 2040 to the second network controller 2041 once every several packets. At this time, it is assumed that initial setting of a buffer size capable of storing communication data equivalent to two or three packets is completed for each of the transferring FIFO buffers 2046, 2047. The initial settings are completed when, for example, the CPU 2002 loads size data into the size register.

For example, when communication data equivalent to four packets arrives from the network line interface 2049 side, the system tries to accumulate the communication data in the transferring FIFO buffer 2046. Nevertheless, because the second network controller 2041 is being used for another data transfer, the transferring FIFO buffer 2046 cannot store all of the communication data without any processing even if the communication data equivalent to four packets arrives. Accordingly, a part of the data is discarded. As a result, if the transferring FIFO buffer 2046 overflows before the second network controller 2041 becomes unoccupied, the transferring FIFO buffer 2046 is flashed, which requires retransmission of the communication data, resulting in overhead of communication. Such a situation in which communication data is concentrated in one network controller can also be found in a case where if there is a third network controller, the second network controller can occupy a communication path between the second network controller and the third network controller. In order to cope with the situation in which communication data is concentrated in one network controller, using the undermentioned dynamic variable control for the storage capacity of a buffer area suffices.

Figure 28:
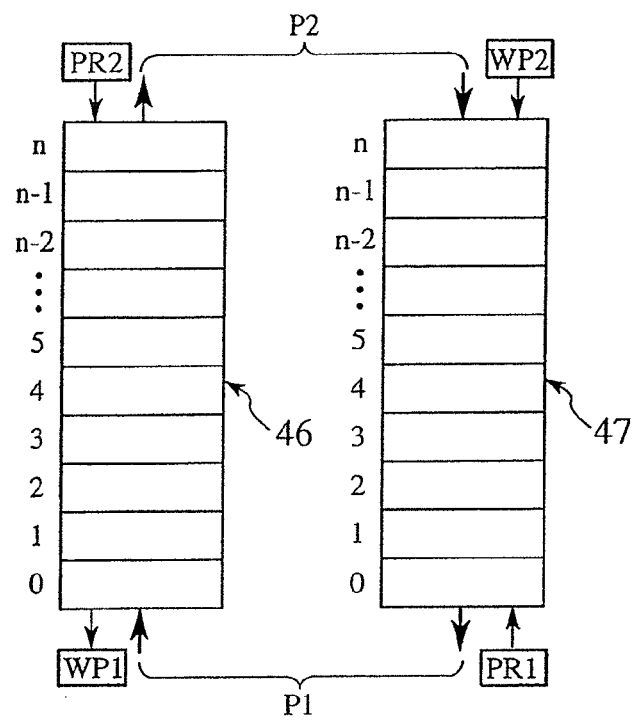
FIG. 28 is an explanatory diagram schematically illustrating a buffer area of a transferring FIFO buffer.

Next, the dynamic variable control for the storage capacity of the transferring FIFO buffer will be described as below. In the first place, with reference to FIG. 28, a case where the dynamic variable control is not performed for the transferring FIFO buffers 2046, 2047 will be described. FIG. 28 schematically illustrates buffer areas of the transferring FIFO buffers 2046, 2047. The storage capacity equivalent to n address x i bit is allocated to each of the buffers 2046, 2047. In this case, n can be separately determined for each of the transferring FIFO buffers 2046, 2047 according to each buffer size information. i is an arbitrary fixed value. Address pointers on a first port P1 side connected to the first network controller 2040, are a write pointer WP1 and a read pointer RP1. The pointers WP1, RP1 are considered as an example of the read/write pointer address counter 2061L shown in FIG. 24. Address pointers on a second port P2 side connected to the second network controller 2041 are a write pointer WP2 and a read pointer RP2. The pointers WP2, RP2 are considered as an example of the read/write pointer address counter 2061R shown in FIG. 24. Because data is read and written by means of the FIFO, a write address is generated in the write pointer WP1 (WP2), and a read address is generated in the read pointer RP2 (RP1). Addresses 0 through n are assigned to each buffer area having addresses, the number of which is n. In a reset state of the transferring FIFO buffers 2046, 2047, both of the read address pointer RP1 (RP2) and the write address pointer WP2 (WP1) are set at address 0. After the operation starts, the write pointer always precedes. Every time a write acoess is made, the write pointer is incremented by one. On the other hand, as for the read pointer RP1 (RP2), if the write pointer WP2 (WP1) proceeds, read operation can be repeated until the read pointer RP1 (RP2) catches up with (becomes the same as) the write pointer WP2 (WP1). If the write pointer reaches address n which is the maximum value, the write pointer is reset to 0 before incrementing the write pointer likewise. The read pointer also operates likewise. As described above, the read pointer, and the write pointer, of the transferring FIFO buffers 2046, 2047 are managed by joining them in a ring. Because of the features of the FIFO operation, the read pointer cannot get ahead of a value of the write pointer. In a similar manner, the write pointer cannot become equal to a value of the read pointer. When the read pointer reaches a value of the write pointer, there is no stored information which can be read. This means that the FIFO buffer is in an empty state. When the write pointer reaches a value just before that of the read pointer, there is no writable memory area, which means a full state.

Figure 29:
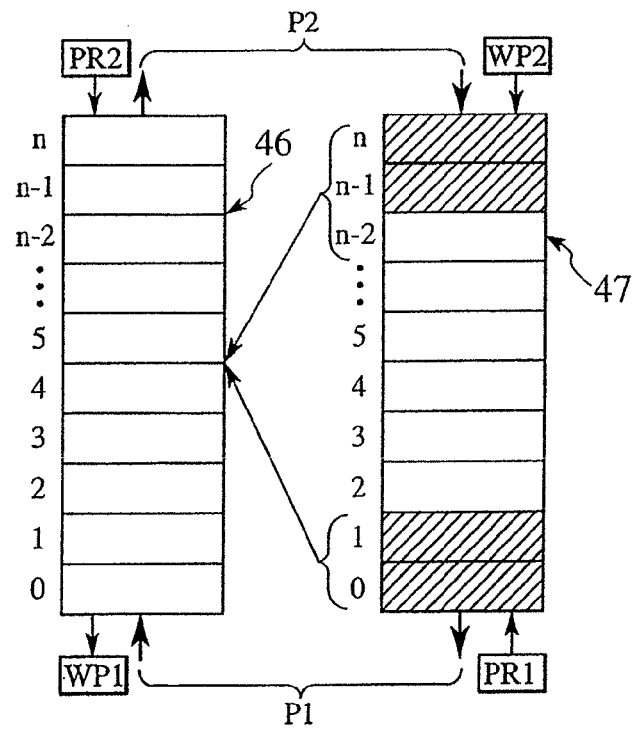
FIG. 29 is an explanatory diagram schematically illustrating an operation mode used when dynamic variable control for the storage capacity of transferring FIFO buffers is enabled.

FIG. 29 schematically illustrates an operation mode used when dynamic variable control for the storage capacity of the transferring FIFO buffers 2046, 2047 is enabled. Here, an unoccupied area of the transferring FIFO buffer 2047 is dynamically and temporarily added to the transferring FIFO buffer 2046 so that the apparent storage capacity of the transferring FIFO buffer 2046 becomes large. This is how the storage capacity is controlled. As a matter of convenience, operation for the following case will be described: when a difference between the read pointer and the write pointer became 4 or less, a FIFO overflow alarm is output; and then unoccupied areas indicated by addresses 0, 1, n−1, n in the transferring FIFO buffer 2047 on the opposite side are temporarily added to the transferring FIFO buffer 2046. A configuration of the transferring FIFO buffers 2046, 2047 is the same as that described in FIG. 28.

Figure 30:
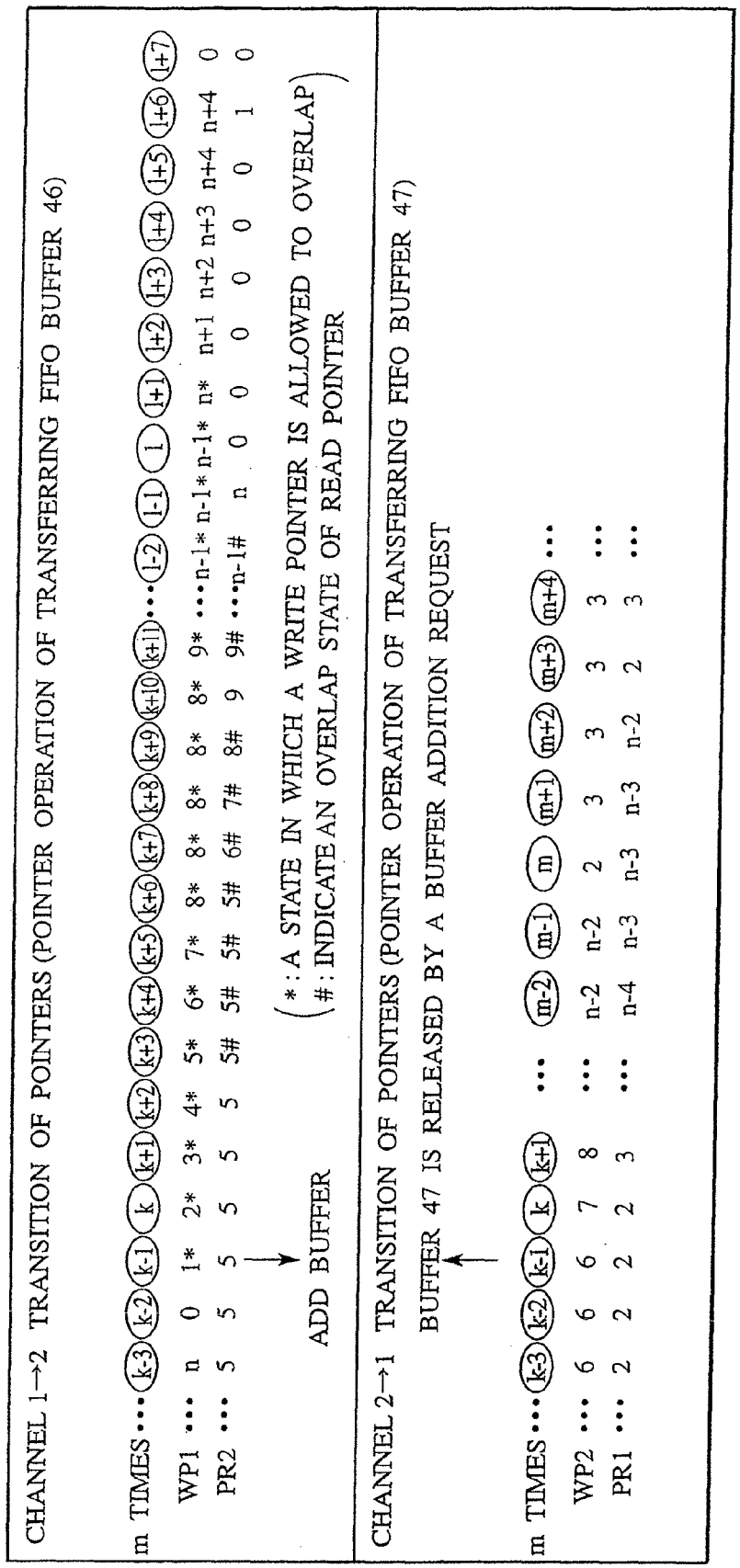
FIG. 30 is an explanatory diagram illustrating an operation example of the dynamic variable control shown in FIG. 29.

FIG. 30 illustrates an operation example of the dynamic variable control shown in FIG. 29. With reference to the operation of the transferring FIFO buffer 2046, at an event k−3, the write pointer WP1 is n which is the maximum value, and the read pointer RP2 is 5. At an event of k−1, the write pointer WP1 is 1, and the read pointer RP2 is 5. Accordingly, the difference between the write pointer and the read pointer is 4 or less, which causes the alarm to be output. In addition to it, a request for buffer addition is issued to the transferring FIFO control unit 2052R on the second port P2 side. At this time, there are empty areas in the transferring FIFO buffer 2047 on the opposite side. Therefore, at this time, an instruction to add areas corresponding to four addresses starting from the lastly read address (a value of the read pointer RP1−1) in the transferring FIFO buffer 2047, that is to say, areas indicated by addresses 1, 0, n, n−1, to the transferring FIFO buffer 2046 is given to the transferring FIFO control unit 2052R on the second port P2 side. In addition, the transferring FIFO control unit 2052L on the first port P1 side recognizes it.

In a state in which read by the read pointer RP2 stops at address 5, if the write operation continues by the write pointer WP1, the transferring FIFO control unit 2052L primarily overflows at an event k+3. However, operation equivalent to that performed when four unoccupied storage areas which can be temporarily added are inserted just after a storage area indicated by the read pointer is enabled. To be more specific, as illustrated in the event k−1, when a request for buffer addition is issued, a permission flag of overlapping is set in the write pointer WP1. An overlap state flag is set, which means that the write pointer WP1 used a temporarily added storage area at the event k+3. Moreover, subsequent write operation by the write pointer WP1 causes an overflow state. The overlap permission state continues until the write pointer WP1 becomes n at an event of 1+1, and is cancelled at n+1. Because the areas corresponding to four addresses are temporarily added, calculation of the write pointer WP1 proceeds to n+1, n+2, n+3, n+4. The read pointer RP2 is reset to 0 at the event 1. However, in the next read count cycle by the read pointer RP2, data is written into the temporarily added areas. Therefore, calculation of the read pointer RP2 is required to proceed to n+1, n+2, n+3, n+4.

As for the transferring FIFO buffer 2047, values of the read pointer RP1 and the write pointer WP2 are controlled so that areas indicated by four released addresses n−1, n, 0, 1 are not used.

Figure 31:
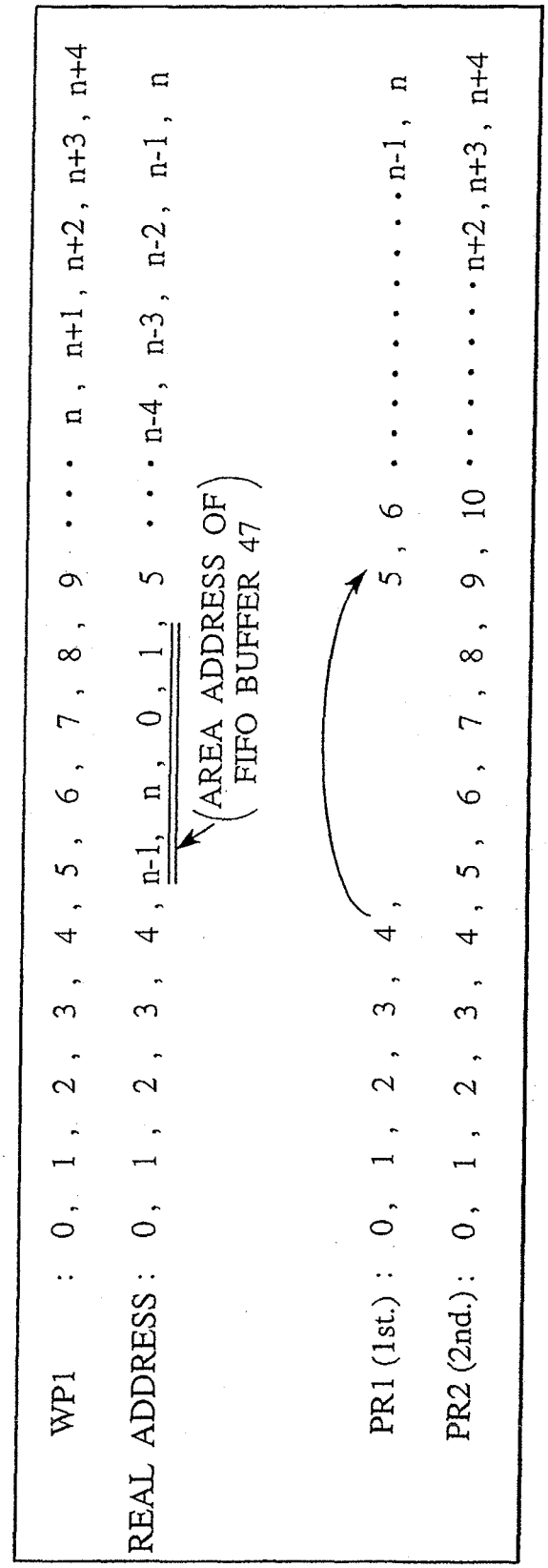
FIG. 31 is an explanatory diagram illustrating the association of a write pointer value with a real address for a writing area, and calculation transition of a read pointer RP2, in the dynamic variable control shown in FIG. 29.

The association of the four addresses n−1, n, 0, 1 released in the transferring FIFO buffer 2047 with the four addresses indicating the storage areas, which have been temporarily added between addresses 4 and 5 in the transferring FIFO buffer 2047, are controlled by providing each of pointer address control units 2062L, 2062R with a correspondence table so that required storage areas are selected. FIG. 31 illustrates the association of a value of the write pointer WP1 at that time with a real address of a writing area. Values 5, 6, 7, 8 of the write pointer WP1 are associated with area addresses n−1, n, 0, 1 of the FIFO buffer 2047. Using such association, a write access to the FIFO buffers 2046, 2047 is performed. In addition, FIG. 31 illustrates calculation transition of the read pointer RP2. In the first round (1st) during which temporary addition is started, the read pointer RP2 counts up to n, and an area of the transferring FIFO buffer 2046 is selected for read operation. In the second round (2nd), calculation operation of the read pointer RP2, including the temporarily added areas, is performed to select appropriate areas of the transferring FIFO buffers 2046, 2047 for read operation.

If the dynamic variable control of the storage capacity for the transferring FIFO buffers 2046, 2047 is used, when a transmission request from the CPU side conflicts with a bypass request from the other network controller side for one network controller for example, causing transmission requests from a plurality of transmission request senders to conflict with each other, it is possible to reserve sufficient capacity of a buffer for one transmission request side while responding to another transmission, which prevents overflow of data from occurring.

Although the invention devised by the inventor has been described in its preferred embodiments, the present invention is not limited in its practical application to those embodiments and many changes and modifications are possible without departing from the scope and spirit thereof.

For example, the network controller or the data communication channel is not limited to Ethernet (registered trademark) controller. They can also be broadly applied to other communication protocols such as Bluetooth. In addition, the number of network controllers or data communication channels is not limited to two. It may be proper plurality of network controllers or data communication channels. The transfer rate is also not limited to 10 Mbps, 100 Mbps. Moreover, on-chip functions in the data processor are not limited to the examples described above. They can be properly changed.

Effects, which can be obtained front typical features of the present invention disclosed in this application concerned, will be briefly described as below.

To be more specific, use of the transferring FIFO buffer enables data transfer from one network to another network without putting a load on the CPU. Variable setting of the storage capacity for the transferring FIFO buffer becomes possible. When connecting to a network having a different data transfer rate, a line speed of the network is recognized, and thereby a larger storage area can be allocated to a high-speed transferring FIFO buffer. An alarm for notifying of a lack of the capacity of a transferring FIFO buffer is output, which permits an unoccupied storage area of another transferring FIFO buffer to be released. Temporarily adding a released storage area, etc. to a storage area of another transferring FIFO buffer can make dynamically the storage capacity of the transferring FIFO buffer variable in response to a state of communication.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A packet communication system connectable to a plurality of networks, comprising:
    a plurality of physical layer transceivers;
    a packet communication device connectable to the plurality of networks through the plurality of physical layer transceivers, respectively;
    an analog input terminal that generates an analog transmit signal;
    an A/D converter that receives the analog transmit signal from the analog input terminal, converts the analog transmit signal into a digital transmit signal, and applies the digital transmit signal to the packet communication device;
    a D/A converter that receives a digital received signal from the packet communication device, and converts the digital received signal into an analog received signal;
    an analog output terminal that receives the analog received signal from the D/A converter,
    wherein the packet communication device comprises:
        a plurality of communication circuits for transmitting and receiving a packet to and from a plurality of communication targets;
        a packet generation processing circuit for generating a packet to be transmitted by the plurality of communication circuits, and processing a packet received by the plurality of communication circuits;
        a transfer buffer circuit for holding a transfer packet which is used to give and receive information mutually between the plurality of communication targets; and
        a transfer control circuit for, if it is judged that the packet received by the plurality of communication circuits is the transfer packet, outputting the received packet to the transfer buffer circuit, and outputting either a packet generated by the packet generation processing circuit or a transfer packet held in the transfer buffer circuit on a priority basis to a specified communication circuit corresponding to a communication target to which the packet is transmitted or transferred,
    wherein, if a usage rate of the transfer buffer circuit exceeds a threshold value, the transfer control circuit makes the priority order of the transfer packet higher than that of the generated packet, and thereby outputs the transfer packet to the specified communication circuit in preference to the generated packet, and
    wherein the transfer control circuit comprises a priority-order register which can be set by the packet generation processing circuit, and the priority-order register is loaded with the threshold value for changing the priority order, the threshold value being related to a usage rate of the transfer buffer circuit.

2. The packet communication system according to claim 1, wherein low priority packets are transmitted without discard.

3. The packet communication system according to claim 2, wherein, if the usage rate of the transfer buffer circuit exceeds the threshold value for flow control, the transfer control circuit outputs a flow-control packet to a specified communication circuit corresponding to a communication target from which transfer is made.

4. The packet communication system according to claim 2, further comprising:
    a receiving buffer circuit for temporarily holding a packet received by the plurality of communication circuits,
    wherein, if the usage rate of the receiving buffer circuit exceeds a threshold value for flow control, the transfer control circuit outputs a flow-control packet to a specified communication circuit corresponding to a communication target from which transmission is made.

5. A packet communication system connectable to a plurality of networks, comprising:
    a plurality of physical layer transceivers;
    a packet communication device connectable to the plurality of networks through the plurality of physical layer transceivers, respectively;
    an analog input terminal that generates an analog transmit signal;
    an A/D converter that receives the analog transmit signal from the analog input terminal, converts the analog transmit signal into a digital transmit signal, and applies the digital transmit signal to the packet communication device;
    a D/A converter that receives a digital received signal from the packet communication device, and converts the digital received signal into an analog received signal;
    an analog output terminal that receives the analog received signal from the D/A converter,
    wherein the packet communication device comprises:
        a plurality of communication circuits for transmitting and receiving a packet to and from a plurality of communication targets;
        a packet generation processing circuit for generating a packet to be transmitted by the plurality of communication circuits, and processing a packet received by the plurality of communication circuits;

a transfer buffer circuit for holding a transfer packet which is used to give and receive information mutually between the plurality of communication targets; and a transfer control circuit by which the packet received by the plurality of communication circuits is judged to be a packet which should be processed by the packet generation processing circuit or to be the transfer packet, and according to the result of the judgment, the received packet is output to the packet generation processing circuit or the transfer packet circuit, and either the packet generated by the packet generation processing circuit or the transfer packet held in the transfer buffer circuit is output, on a priority basis, to a specified communication circuit corresponding to a communication target to which the packet is transmitted or transferred, wherein, if a usage rate of the transfer buffer circuit exceeds a threshold value for changing the priority order, the transfer control circuit makes the priority order of the transfer packet higher than that of the generated packet, and thereby outputs the transfer packet to the specified communication circuit in preference to the generated packet, wherein low priority packets are transmitted without discard, and wherein the transfer control circuit comprises a priority-order register which can be set by the packet generation processing circuit, and the priority-order register is loaded with the threshold value for changing the priority order, the threshold value being related to a usage rate of the transfer buffer circuit.

6. A packet communication system connectable to a plurality of networks, comprising:

a plurality of physical layer transceivers;

a packet communication device connectable to the plurality of networks through the plurality of physical layer transceivers, respectively;

an analog input terminal that generates an analog transmit signal;

an A/D converter that receives the analog transmit signal from the analog input terminal, converts the analog transmit signal into a digital transmit signal, and applies the digital transmit signal to the packet communication device;

a D/A converter that receives a digital received signal from the packet communication device, and converts the digital received signal into an analog received signal;

an analog output terminal that receives the analog received signal from the D/A converter, wherein the packet communication device comprises:

a plurality of communication circuits for transmitting and receiving a packet, which includes an IP address and a port as its additional address, to and from a plurality of communication targets;

a priority-order judging circuit for, according to a combination of the IP address and the port, judging the priority order relating to the extent to which the packet requires real-time processing;

a plurality of transmit buffer circuits for holding a transmit packet in association with the priority order relating to the extent to which real-time processing is required; and a prioritized-packet selecting circuit for selecting a packet having the highest priority order from among transmit packets held in the plurality of transmit buffer circuit according to the result of judgment by the priority-order judging circuit, and outputting the selected packet, on a priority basis, to a specified communication circuit corresponding to a communication target to which the packet is transmitted or transferred, wherein low priority packets are transmitted without discard, wherein, if a usage rate of one of the plurality of transmit buffer circuit exceeds a threshold value, the prioritized-packet selecting circuit outputs a packet held in the one of the plurality of transmit buffer circuit, in which the threshold value is exceeded, to the specified communication circuit in preference to other packets, and wherein the prioritized-packet selecting circuit comprises a register which can be set by the packet generation processing circuit, and the register is loaded with the threshold value relating to a usage rate of the transfer buffer circuit.

7. The packet communication system according to claim 6, further comprising:

a packet generation processing circuit for generating a packet to be transmitted by the plurality of communication circuits, and processing a packet received by the plurality of communication circuits; a transfer buffer circuit for holding a transfer packet which is used to give and receive information mutually between the plurality of communication targets; and a transfer control circuit by which the packet received by the plurality of communication circuit is judged to be a packet which should be processed by the packet generation processing circuit, or to be the transfer packet, and according to the result of the judgment, the received packet is output to the packet generation processing circuit or the transfer packet circuit, and the packet generated by the packet generation processing circuit is output to the transmit buffer circuit, wherein the prioritized-packet selecting circuit outputs the transfer packet held in the transfer buffer circuit to a specified transmit buffer circuit according to the priority order.

* * * * *